United States Patent
Yamaguchi et al.

(10) Patent No.: US 10,895,511 B2
(45) Date of Patent: Jan. 19, 2021

(54) DYNAMOMETER SYSTEM

(71) Applicant: MEIDENSHA CORPORATION, Tokyo (JP)

(72) Inventors: Takashi Yamaguchi, Tokyo (JP); Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/604,913

(22) PCT Filed: Apr. 9, 2018

(86) PCT No.: PCT/JP2018/014943
§ 371 (c)(1),
(2) Date: Oct. 11, 2019

(87) PCT Pub. No.: WO2018/190303
PCT Pub. Date: Oct. 18, 2018

(65) Prior Publication Data
US 2020/0103296 A1    Apr. 2, 2020

(30) Foreign Application Priority Data
Apr. 14, 2017   (JP) .................................. 2017-080583

(51) Int. Cl.
*G01M 17/007*   (2006.01)
*G01L 3/16*   (2006.01)
(Continued)

(52) U.S. Cl.
CPC .................. *G01L 3/16* (2013.01); *G01L 3/04* (2013.01); *G01M 17/007* (2013.01); *F16H 2061/0078* (2013.01)

(58) Field of Classification Search
CPC .......... G01L 3/242; G01L 3/26; G01M 15/02; G01M 15/04; G01M 15/044; G01M 13/00; H02P 21/20
See application file for complete search history.

(56) References Cited

U.S. PATENT DOCUMENTS 4,745,799 A * 5/1988 Kawarabayashi ........................... G01M 17/0072
73/116.06
5,078,008 A * 1/1992 Yagi .................... G01M 15/044
73/116.05

(Continued)

FOREIGN PATENT DOCUMENTS

JP         3405924 B2    3/2003
JP     2004-361255 A    12/2004

(Continued)

*Primary Examiner* — Tran M. Tran
(74) *Attorney, Agent, or Firm* — Muncy, Geissler, Olds & Lowe, P.C.

(57) ABSTRACT

An electric inertia control device 5A simulates the behavior of an inertial body having a predetermined set moment of inertia $J_{set}$ by means of a dynamometer, and is provided with: an inertia compensator 51A which generates a torque signal by multiplying a signal obtained by subtracting a shaft torque detection signal $T_{12}$ from a higher-level command torque signal T* by the ratio of a moment of inertia $J_1$ of the dynamometer to the set moment of inertia $J_{set}$, and generates an inertia compensation torque signal $T_{ref}$ by summing the torque signal and the shaft torque detection signal $J_1$; and a resonance suppression control circuit 53A which uses the inertia compensation torque signal $T_{ref}$ and the shaft torque detection signal $T_{12}$ to generate a torque current command signal $T_1$ in such a way as to suppress resonance in a mechanical system including a test piece and the dynamometer.

4 Claims, 15 Drawing Sheets

(51) Int. Cl.
*G01L 3/04* (2006.01)
*F16H 61/00* (2006.01)

(56) References Cited

U.S. PATENT DOCUMENTS

| | | | | |
|---|---|---|---|---|
| 5,525,877 | A * | 6/1996 | Umida | H02P 23/16 318/432 |
| 5,589,748 | A * | 12/1996 | Kazama | G05B 11/32 318/560 |
| 5,729,111 | A * | 3/1998 | Ogura | G05D 19/02 318/623 |
| 6,434,454 | B1 * | 8/2002 | Suzuki | G01M 15/02 701/32.9 |
| 6,768,940 | B2 * | 7/2004 | Akiyama | G01M 15/044 701/114 |
| 6,775,610 | B2 * | 8/2004 | Akiyama | G01M 15/044 701/110 |
| 7,142,974 | B2 * | 11/2006 | Sugita | G01M 15/044 701/114 |
| 7,289,915 | B2 * | 10/2007 | Ide | G01M 1/10 702/41 |
| 7,463,938 | B2 * | 12/2008 | Hagihara | G05B 11/42 318/609 |
| 7,610,799 | B2 * | 11/2009 | Sugita | G01M 15/044 73/114.15 |
| 7,911,172 | B2 * | 3/2011 | Ikeda | H02P 6/16 318/560 |
| 8,006,548 | B2 * | 8/2011 | Akiyama | G01M 15/02 73/116.05 |
| 8,120,303 | B2 * | 2/2012 | Kumagai | G05B 13/041 318/560 |
| 8,704,469 | B2 * | 4/2014 | Tadano | H02P 21/05 318/400.02 |
| 8,704,475 | B2 * | 4/2014 | Yamaguchi | H02P 21/0003 318/376 |
| 8,770,019 | B2 * | 7/2014 | Grunbacher | G01M 15/05 73/116.05 |
| 8,803,466 | B2 * | 8/2014 | Yoshiura | G05B 19/19 318/600 |
| 8,860,355 | B2 * | 10/2014 | Ueda | B30B 15/14 318/560 |
| 9,065,374 | B2 * | 6/2015 | Yamaguchi | H02M 7/53875 |
| 9,116,062 | B2 * | 8/2015 | Akiyama | G01L 3/24 |
| 9,143,073 | B2 * | 9/2015 | Takahashi | H02P 23/12 |
| 9,164,005 | B2 * | 10/2015 | Takahashi | H02P 6/06 |
| 9,207,149 | B2 * | 12/2015 | Kanke | G01M 17/007 |
| 9,234,820 | B2 * | 1/2016 | Akiyama | G01M 13/025 |
| 9,255,856 | B2 * | 2/2016 | Takahashi | G01L 5/24 |
| 9,335,228 | B2 * | 5/2016 | Takahashi | G01L 3/22 |
| 9,400,508 | B2 * | 7/2016 | Yamaguchi | G05B 13/042 |
| 9,525,378 | B2 * | 12/2016 | Fujiwara | H02P 21/14 |
| 9,614,474 | B2 * | 4/2017 | Yamaguchi | H02P 21/13 |
| 9,716,457 | B2 * | 7/2017 | Yoshiura | H02P 6/10 |
| 9,778,140 | B2 * | 10/2017 | Suzuki | G01M 15/02 |
| 10,444,119 | B2 * | 10/2019 | Engstrom | G01M 13/025 |
| 10,451,522 | B2 * | 10/2019 | Sugita | G01S 17/58 |
| 10,520,395 | B2 * | 12/2019 | Newberger | G01M 15/05 |
| 2019/0310162 | A1 * | 10/2019 | Pfeiffer | G01M 17/0072 |

FOREIGN PATENT DOCUMENTS

| | | |
|---|---|---|
| JP | 5200715 B2 | 2/2013 |
| JP | 2014-142317 A | 8/2014 |
| JP | 5605127 B2 | 9/2014 |
| JP | 5935853 B2 | 5/2016 |

* cited by examiner

DYNAMOMETER SYSTEM

TECHNICAL FIELD

The present invention relates to electric inertia control devices. More specifically, the present invention relates to an electric inertia control device which simulates, in a dynamometer system where a dynamometer is connected to the input shaft or the output shaft of a test piece, the behavior of an inertial body having predetermined set inertia by the dynamometer.

BACKGROUND ART

A drive train collectively refers to a plurality of devices for transmitting energy generated in an engine to a drive wheel, and is formed with the engine, a clutch, a transmission, a drive shaft, a propeller shaft, a differential gear, the drive wheel and the like. In a performance evaluation test of the drive train, the transmission actually continues to be driven in the engine, and thus the durability, the quality and the like thereof are evaluated. In recent years, it has been proposed that a dynamometer system in which a dynamometer is coupled to the output shaft or the input shaft of a drive train serving as a test piece is used so as to perform a performance evaluation test of the drive train.

In the dynamometer system as described above, a load which simulates the engine with an input-side dynamometer coupled to the input shaft of the drive train can be input to the drive train, and a load which simulates a travelling vehicle body with an out-side dynamometer coupled to the output shaft of the drive train can be absorbed. In the dynamometer system as described above, electric inertia control which electrically compensates for the inertia of the dynamometer to set inertia determined with consideration given to an actual device is performed such that the behavior of the input-side dynamometer and the output-side dynamometer is brought close to a behavior corresponding to the actual device.

FIG. 15 is a diagram showing an example of a conventional electric inertia control device 100. In the electric inertia control device 100, a dynamometer system formed by coupling a dynamometer having a moment of inertia $J_1$ and a test piece having a moment of inertia $J_2$ with a coupling shaft having shaft rigidity $K_{12}$ is a control target 101. The electric inertia control device 100 generates an angular speed signal by multiplying a signal obtained by integrating a torque signal obtained by subtracting a shaft torque detection signal $T_{12}$ from a higher-level command torque signal T* by the reciprocal of a predetermined set moment of inertia $J_{set}$, and further performs speed control corresponding to a difference between the angular speed signal and an angular speed detection signal $\omega_1$ of the dynamometer so as to perform inertia compensation. In this way, in the dynamometer, the behavior of an inertial body having the set moment of inertia can be simulated. However, in the electric inertia control device 100 of FIG. 15, a plurality of integrators are present, and thus a significant control delay occurs, with the result that the enhancement of a control bandwidth is limited depending on the degree of facility resonance.

FIG. 16 is a diagram showing the configuration of an electric inertia control device 150 based on the disclosure of patent document 1. In the electric inertia control device 150, a torque signal obtained by subtracting a shaft torque detection signal $T_{12}$ from a higher-level command torque signal T* is multiplied by a ratio of the moment of inertia $J_1$ of a dynamometer to a set function $J_{set}$, and the resulting torque signal and the shaft torque detection signal $T_{12}$ are summed so as to generate a torque current command signal $T_1$. In the electric inertia control device 150 of FIG. 16, the shaft torque detection signal $T_{12}$ is directly fed back such that the moment of inertia $J_1$ of the dynamometer is cancelled out and that thus an inertial body is provided in which the moment of inertia of the dynamometer is the set moment of inertia $J_{set}$.

Patent Document 1: Japanese Unexamined Patent Application, Publication No. 2004-361255

DISCLOSURE OF THE INVENTION

Problems to be Solved by the Invention

In the electric inertia control device 150 of FIG. 16, control can be performed in which a delay is reduced as compared with the electric inertia control device 100 of FIG. 15. However, in the electric inertia control device 150 of FIG. 16, the shaft torque detection signal is directly fed back, and thus the control may become unstable depending on the degree of facility resonance. As described above, in the conventional electric inertia control devices 100 and 150, it is possible to respond to a control request in a low bandwidth but it may be impossible to sufficiently respond to a control request in a high bandwidth.

For example, when a test is performed by using an input-side dynamometer so as to simulate an actual engine, since a torque pulsation produced in the actual engine is simulated, as a higher-level command torque signal, a signal containing a harmonic component may be input to an electric inertia control device. For example, when a test is performed by using an output-side dynamometer so as to simulate an actual vehicle body, since a slip phenomenon occurring in the actual vehicle body is reproduced, in an electric inertia control device, a quick behavior of an inertial body having a very small moment of inertia may be simulated. Hence, an electric inertia control device is desired which can also sufficiently respond to a control request in a high bandwidth.

An object of the present invention is to provide an electric inertia control device which simulates the behavior of an inertial body having predetermined set inertia by a dynamometer and which can perform control up to a high bandwidth.

Means for Solving the Problems (1) A dynamometer system includes: a test piece which includes an input shaft and an output shaft; a dynamometer which is connected to any one of the input shaft and the output shaft through a coupling shaft; an inverter which supplies electric power to the dynamometer according to a torque current command signal; and a shaft torque sensor which generates a shaft torque detection signal corresponding to a shaft torque occurring in the coupling shaft. An electric inertia control device simulates the behavior of an inertial body having predetermined set inertia by the dynamometer, and includes: an inertia compensator which generates a torque signal by multiplying a signal obtained by subtracting the shaft torque detection signal from a higher-level command torque signal by a ratio of inertia of the dynamometer to the set inertia and which sums the torque signal and the shaft torque detection signal so as to generate an inertia compensation torque signal that simulates the inertial body; and a resonance suppression control circuit which generates the torque current command signal so as to suppress resonance of a mechanical system that includes the test piece and the dynamometer by using the inertia compensation torque signal and the shaft torque detection signal.

(2) Preferably, in this case, the dynamometer system includes an angular speed sensor which generates an angular speed detection signal corresponding to the angular speed of the dynamometer, the electric inertia control device further includes a disturbance observer which generates a disturbance compensation torque signal based on a difference between an estimation signal obtained by using the inertia compensator and a detection signal obtained by using the angular speed detection signal and the inertia compensator generates the inertia compensation torque signal by using a torque signal obtained by summing a torque signal obtained before the multiplication by the ratio or a torque signal obtained after the multiplication by the ratio and the disturbance compensation torque signal.

(3) Preferably, in this case, the inertia compensator generates a pre-conversion torque signal by subtracting the shaft torque detection signal from the higher-level command torque signal, generates a post-conversion torque signal by multiplying the pre-conversion torque signal by the ratio, and generates the inertia compensation torque signal by summing the post-conversion torque signal and, the disturbance compensation torque signal and the shaft torque detection signal, and the disturbance observer generates the disturbance compensation torque signal by subtracting, from a signal obtained by summing the post-conversion torque signal and the disturbance compensation torque signal, a signal obtained by differentiating the angular speed detection signal and further multiplying a resulting signal by the inertia of the dynamometer.

(4) Preferably, in this case, the inertia compensator generates a pre-conversion torque signal by summing a signal obtained by subtracting the shaft torque detection signal from the higher-level command torque signal and the disturbance compensation torque signal, generates a post-conversion torque signal by multiplying the pre-conversion torque signal by the ratio, and generates the inertia compensation torque signal by summing the post-conversion torque signal and the shaft torque detection signal, and the disturbance observer generates the disturbance compensation torque signal by subtracting, from the pre-conversion torque signal, a signal obtained by differentiating the angular speed detection signal and further multiplying a resulting signal by the set inertia.

(5) Preferably, in this case, the inertia compensator generates a pre-conversion torque signal by subtracting the shaft torque detection signal from the higher-level command torque signal, generates a post-conversion torque signal by multiplying the pre-conversion torque signal by the ratio, and generates the inertia compensation torque signal by summing the post-conversion torque signal, the disturbance compensation torque signal and the shaft torque detection signal, and the disturbance observer generates an angular speed signal by subtracting, from a signal obtained by integrating the post-conversion torque signal and further multiplying a resulting signal by a reciprocal of the inertia of the dynamometer, the angular speed detection signal, and generates the disturbance compensation torque signal by multiplying the angular speed signal by a parameter having a dimension of the inertia.

(6) Preferably, in this case, the inertia compensator generates a pre-conversion torque signal by summing a signal obtained by subtracting the shaft torque detection signal from the higher-level command torque signal and the disturbance compensation torque signal, generates a post-conversion torque signal by multiplying the pre-conversion torque signal by the ratio, and generates the inertia compensation torque signal by summing the post-conversion torque signal and the shaft torque detection signal, and the disturbance observer generates an angular speed signal by subtracting, from a signal obtained by integrating a signal obtained by subtracting the shaft torque detection signal from the higher-level command torque signal and further multiplying a resulting signal by a reciprocal of the set inertia, the angular speed detection signal, and generates the disturbance compensation torque signal by multiplying the angular speed signal by a parameter having a dimension of the inertia.

Effects of the Invention (1) In the electric inertia control device of the present invention, an inertia compensator generates a torque signal by multiplying a signal obtained by subtracting a shaft torque detection signal from a higher-level command torque signal by a ratio of inertia of a dynamometer to set inertia and further sums the torque signal and a shaft torque detection signal so as to generate an inertia compensation torque signal that simulates an inertial body. In the inertia compensator, as described above, the shaft torque detection signal is directly fed back so as to generate the inertia compensation torque signal, and thus the dynamometer can highly accurately simulate the behavior of the inertial body having the set inertia. In the electric inertia control device of the present invention, a resonance suppression control circuit uses the inertia compensation torque signal obtained in the inertia compensator and the shaft torque detection signal to generate a torque current command signal so as to suppress the resonance of a mechanical system that includes a test piece and the dynamometer. In this way, in the electric inertia control device of the present invention, it is possible to extend a control request up to a high bandwidth while preventing instability caused by a resonance phenomenon in the mechanical system.

(2) In the electric inertia control device of the present invention, a disturbance observer uses a difference between an estimation signal obtained by using the inertia compensator and a detection signal obtained by using the angular speed detection signal so as to generate a disturbance compensation torque signal, and the inertia compensator sums the disturbance compensation torque signal and a torque signal obtained before the multiplication by the ratio or a torque signal obtained after the multiplication by the ratio so as to generate the inertia compensation torque signal. In the electric inertia control device of the present invention, it is possible to highly accurately achieve electric inertia control corresponding to the set inertia while compensating for a deviation caused by a disturbance such as a control error in an inverter or a loss in the dynamometer.

(3) In the electric inertia control device of the present invention, the inertia compensator subtracts the shaft torque detection signal from the higher-level command torque signal so as to generate a pre-conversion torque signal, multiplies the pre-conversion torque signal by the ratio so as to generate a post-conversion torque signal and sums the post-conversion torque signal, the disturbance compensation torque signal and the shaft torque detection signal so as to generate the inertia compensation torque signal. The disturbance observer subtracts, from a signal obtained by summing the post-conversion torque signal and the disturbance compensation torque signal, a signal obtained by differentiating the angular speed detection signal and further multiplying the resulting signal by the moment of inertia of the dynamometer so as to generate the disturbance compensation torque signal. In the electric inertia control device of the present invention, it is possible to highly accurately achieve electric inertia control corresponding to the set inertia while compensating for a deviation caused by a disturbance such as a control error in an inverter or a loss in the dynamometer.

(4) In the electric inertia control device of the present invention, the inertia compensator sums a signal obtained by subtracting the shaft torque detection signal from the higher-level command torque signal and the disturbance compensation torque signal so as to generate a pre-conversion torque signal, multiplies the pre-conversion torque signal by the ratio so as to generate a post-conversion torque signal and sums the post-conversion torque signal and the shaft torque detection signal so as to generate the inertia compensation torque signal. The disturbance observer subtracts, from the pre-conversion torque signal, a signal obtained by differentiating the angular speed detection signal and further multiplying the resulting signal by the set inertia so as to generate the disturbance compensation torque signal. In other words, in the electric inertia control device of the present invention, the disturbance compensation is performed on the pre-conversion torque signal before the multiplication by the ratio, and thus even when the moment of inertia of the dynamometer is deviated from the actual moment, the deviation is compensated for, with the result that it is possible to more highly accurately achieve the electric inertia control corresponding to the set inertia.

(5) In the electric inertia control device of the present invention, the inertia controller subtracts the shaft torque detection signal from the higher-level command torque signal so as to generate a pre-conversion torque signal, multiplies the pre-conversion torque signal by the ratio so as to generate a post-conversion torque signal and further sums the post-conversion torque signal, the disturbance compensation torque signal and the shaft torque detection signal so as to generate the inertia compensation torque signal. The disturbance observer subtracts, from a signal obtained by integrating the post-conversion torque signal and further multiplying the resulting signal by the reciprocal of the inertia of the dynamometer, the angular speed detection signal so as to generate an angular speed signal, and multiplies the angular speed signal by a parameter having a dimension of the inertia so as to generate the disturbance compensation torque signal. In the electric inertia control device of the present invention, the same effects as in the invention of (3) described above are achieved. In the invention of (3) described above, since the disturbance observer performs the differential operation which causes noise, in order to generate the disturbance compensation torque signal, it is necessary to use a low-pass filter. By contrast, in the disturbance observer of the present invention, since the disturbance compensation torque signal is generated by the integration operation, it is not necessary to use the low-pass filter described above.

(6) In the electric inertia control device of the present invention, the inertia controller subtracts the shaft torque detection signal from the higher-level command torque signal and further sums the resulting signal and the disturbance compensation torque signal so as to generate a pre-conversion torque signal, multiplies the pre-conversion torque signal by the ratio so as to generate a post-conversion torque signal and further sums the post-conversion torque signal and the shaft torque detection signal so as to generate the inertia compensation torque signal. The disturbance observer subtracts, from a signal obtained by integrating a signal obtained by subtracting the shaft torque detection signal from the higher-level command torque signal and further multiplying the resulting signal by the reciprocal of the set function, the angular speed detection signal so as to generate an angular speed signal and further multiplies the angular speed signal by a parameter having a dimension of the inertia so as to generate the disturbance compensation torque signal. In the electric inertia control device of the present invention, the same effects as in the invention of (4) described above are achieved. In the electric inertia control device of the present invention, due to the same reason as in the invention of (5) described above, it is not necessary to use the low-pass filter described above.

PREFERRED MODE FOR CARRYING OUT THE INVENTION

Figure 1:
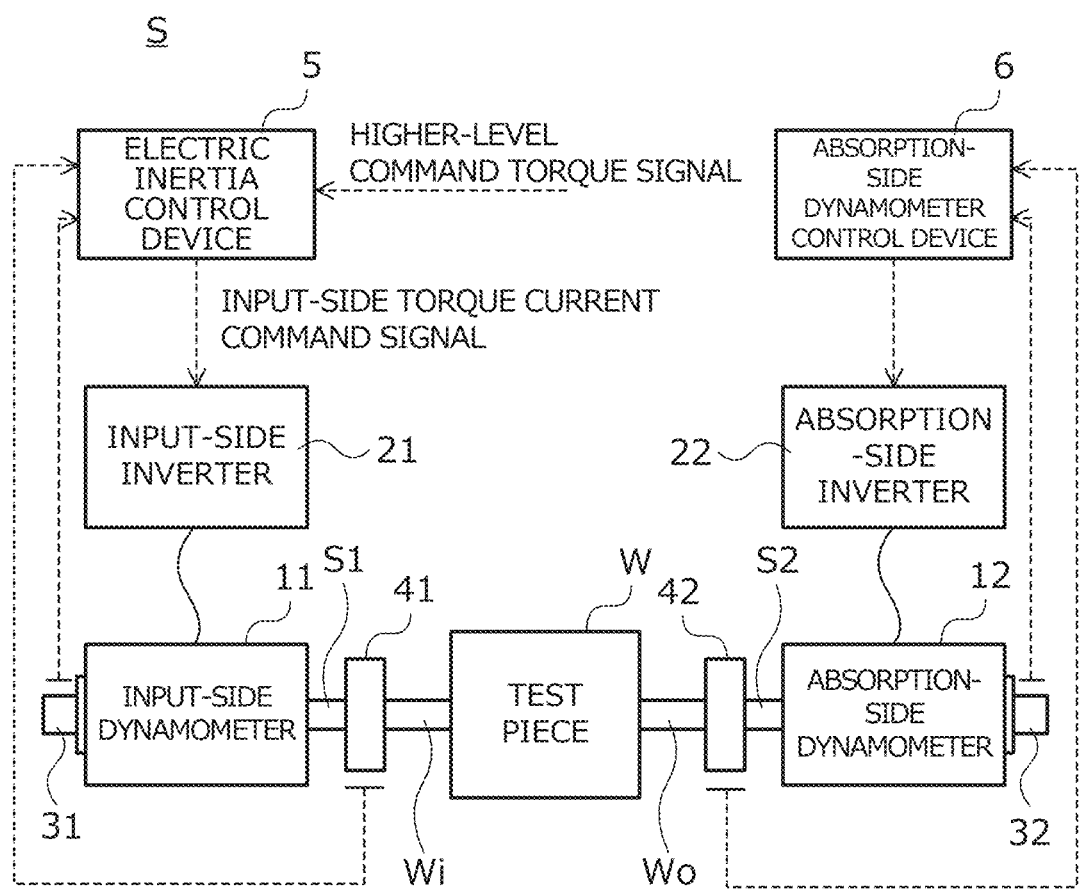
FIG. 1 is a diagram showing the configuration of a dynamometer system according to an embodiment of the present invention.

An embodiment of the present invention will be described in detail below with reference to drawings. FIG. 1 is a diagram showing the configuration of a dynamometer system S according to the present embodiment. In the dynamometer system S, a drive train of a vehicle including an input shaft Wi and an output shaft Wo connected to the input shaft Wi so as to be able to transmit power is a test piece W, and the performance of the test piece W is evaluated, and the dynamometer system S is referred to as a so-called drive train bench system.

Although in the following discussion, a case where a drive train incorporated in a so-called rear wheel drive (FR) vehicle is a test piece W will be described, the present invention is not limited to this case. More specifically, for example, a drive train which includes one input shaft and two output shafts connected to the input shaft so as to be able to transmit power and which is incorporated in a so-called front wheel drive (FF) vehicle may be a test piece.

The dynamometer system S includes: the test piece W; an input-side dynamometer 11 which is connected to the input shaft Wi through an input-side coupling shaft S1; an absorption-side dynamometer 12 which is connected to the output shaft Wo through an absorption-side coupling shaft S2; an input-side inverter 21 which supplies electric power to the input-side dynamometer 11 according to an input-side torque current command signal; an absorption-side inverter 22 which supplies electric power to the absorption-side dynamometer 12 according to an absorption-side torque current command signal; an input-side angular speed sensor 31 and an absorption-side angular speed sensor 32 which individually detect the angular speeds of the shafts of the dynamometers 11 and 12; an input-side shaft torque sensor 41 and an absorption-side shaft torque sensor 42 which individually detect the shaft torques of the coupling shafts S1 and S2; an electric inertia control device 5 which generates the input-side torque current command signal and which inputs it to the input-side inverter 21; and an absorption-side dynamometer control device 6 which generates the absorption-side torque current command signal and which inputs it to the absorption-side inverter 22.

The input-side angular speed sensor 31 detects the rotation angle of the shaft of the input-side dynamometer 11 per unit time, generates an input-side angular speed detection signal corresponding to the angular speed and transmits it to the electric inertia control device 5. The absorption-side angular speed sensor 32 detects the rotation angle of the shaft of the absorption-side dynamometer 12 per unit time, generates an absorption-side angular speed detection signal corresponding to the angular speed and transmits it to the absorption-side dynamometer control device 6.

The input-side shaft torque sensor 41 detects the shaft torque generated in the coupling shaft S1, and transmits an input-side shaft torque detection signal corresponding to the shaft torque to the electric inertia control device 5. The absorption-side shaft torque sensor 42 detects the shaft torque generated in the coupling shaft S2, and transmits an absorption-side shaft torque detection signal corresponding to the shaft torque to the absorption-side dynamometer control device 6.

The electric inertia control device 5 uses a higher-level command torque signal generated in an unillustrated higher-level command generation device, the input-side angular speed detection signal and the input-side shaft torque detection signal so as to generate the input-side torque current command signal for simulating the behavior of an inertial body having predetermined set moment of inertia by the input-side dynamometer 11, and inputs it to the input-side inverter 21.

The absorption-side dynamometer control device 6 uses the absorption-side angular speed detection signal and the absorption-side shaft torque detection signal so as to generate the absorption-side torque current command signal according to a known algorithm, and inputs it to the absorption-side inverter 22.

Example 1

Figure 2:
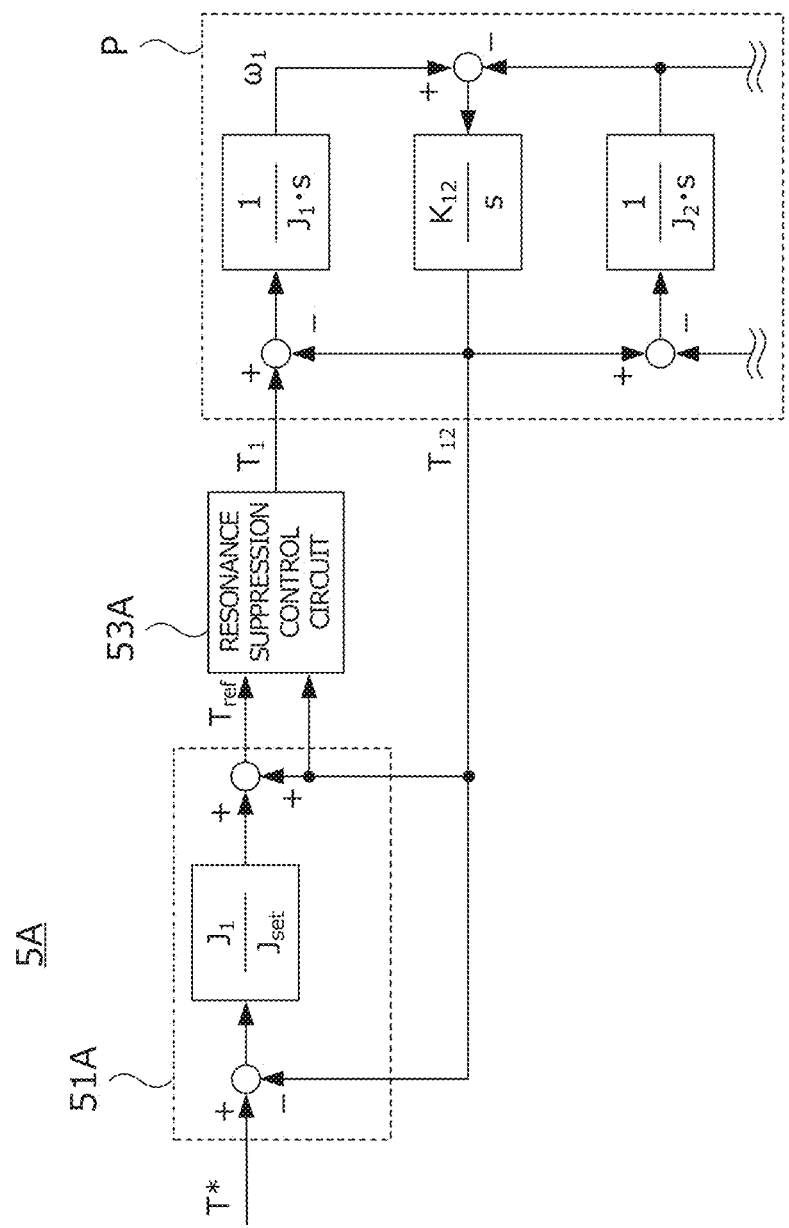
FIG. 2 is a diagram showing the configuration of a control circuit in the electric inertia control device of example 1.

FIG. 2 is a diagram showing the configuration of a control circuit in the electric inertia control device 5A of example 1.

In the electric inertia control device 5A, as described with reference to FIG. 1, a dynamometer system formed by coupling the input shaft of a test piece and an input-side dynamometer through an input-side coupling shaft and coupling the output shaft of the test piece and an absorption-side dynamometer through an absorption-side coupling shaft is a control target P.

In the following description, a Laplace operator is represented by "s", a moment of inertia [kgm$^2$] of the input-side dynamometer is represented by "$J_1$", a moment of inertia [kgm$^2$] of the test piece is represented by "$J_2$" and the shaft rigidity [Nm/rad] of the input-side coupling shaft is represented by "$K_{12}$". Among these parameters, at least a specific value of the moment of inertia $J_1$ is assumed to be known.

Moreover, in the following description, a higher-level command torque signal [Nm] generated by an unillustrated higher-level command generation device is represented by "T*", an input-side torque current command signal [Nm] generated by the electric inertia control device 5A is represented by "$T_1$", an input-side shaft torque detection signal which is a shaft torque [Nm] generated in the input-side coupling shaft and which is the detection signal of an input-side shaft torque sensor is represented by "$T_{12}$" and an input-side angular speed detection signal which is the angular speed [rad/sec] of the shaft of the input-side dynamometer and which is the detection signal of an input-side angular speed sensor is represented by "$\omega_1$".

The electric inertia control device 5A includes: an inertia compensator 51A which generates, based on the higher-level command torque signal T* [Nm] and the input-side shaft torque detection signal $T_{12}$ [Nm], an inertia compensation torque signal $T_{ref}$ [Nm] that simulates an inertial body having a predetermined set moment of inertia $J_{set}$ [kgm$^2$]; and a resonance suppression control circuit 53A which uses the inertia compensation torque signal $T_{ref}$ and the input-side shaft torque detection signal $T_{12}$ to generate the input-side torque current command signal $T_1$ [Nm] so as to suppress the resonance of the control target.

As indicted in formula (1) below, the inertia compensator 51A multiplies a signal obtained by subtracting the input-side shaft torque detection signal $T_{12}$ from the higher-level command torque signal T* by a ratio ($J_1/J_{set}$) of the moment of inertia $J_1$ of the input-side dynamometer to the set moment of inertia $J_{set}$ so as to generate a torque signal, and sums this torque signal (($J_1/J_{set}$)×(T*−$T_{12}$)) and the input-side shaft torque detection signal $T_{12}$ so as to generate the inertia compensation torque signal $T_{ref}$.

$$T_{ref}=(J_1/J_{set})\times(T^*-T_{12})+T_{12} \tag{1}$$

The resonance suppression control circuit 53A generates the input-side torque current command signal $T_1$ based on the inertia compensation torque signal $T_{ref}$ generated in the inertia compensator 51A and the input-side shaft torque detection signal $T_{12}$, and inputs it to an input-side inverter. The resonance suppression control circuit 53A has a resonance suppression control function of generating the input-side torque current command signal $T_1$ which suppresses a resonance phenomenon which can occur in the entire mechanical system of a dynamometer system S formed by coupling, as described above, an input-side dynamometer 11, a test piece W and an absorption-side dynamometer 12 with coupling shafts S1 and S2 except a resonate phenomenon inherent in the test piece W serving as a test target.

Here, the test piece W is assumed to be a drive train which includes various spring elements. In other words, in the dynamometer system S, the rigidity of the test piece W is lower than that of the coupling shafts S1 and S2. Hence, the resonance phenomenon that occurs in the dynamometer system S is divided into a resonance phenomenon which is inherent in the test piece W and which occurs on the side of relatively low frequencies of about several hertz to several tens of hertz and a resonance phenomenon which is inherent in the coupling shafts S1 and S2 and which occurs on the side of relatively high frequencies of several hundreds of hertz or more. The resonance which occurs on the side of relatively high frequencies is the resonance phenomenon which is not related to the properties of the test piece W serving as the test target and which is inherent in the dynamometer system S. Hence, the resonance which occurs on the side of high frequencies is preferably suppressed by the resonance suppression function of the resonance suppression control circuit 53A. On the other hand, the resonance which occurs on the side of low frequencies is the phenomenon which is inherent in the test piece W serving as the test target. Hence, it is not preferable to suppress even the resonance which occurs on the side of low frequencies by the resonance suppression function described above.

Figure 3:
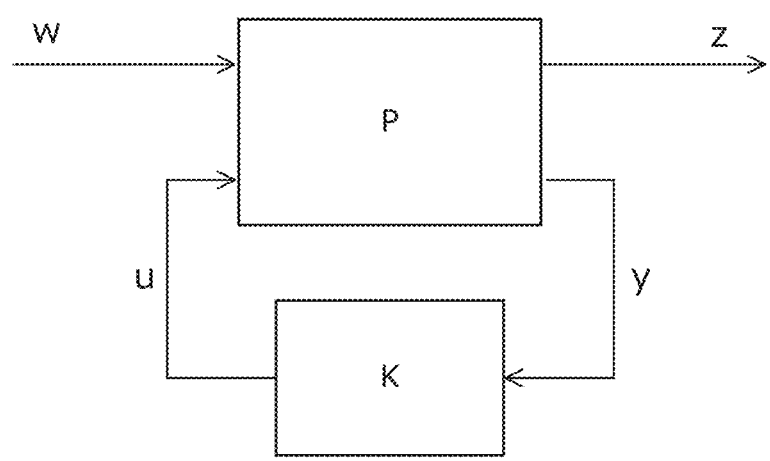
FIG. 3 is a diagram for illustrating a control system design method of H∞ control and a μ design method using a generalized plant.

In the electric inertia control device 53A that has the resonance suppression control function as described above and that is used, a generalized plant P is defined as a control target in which as shown in FIG. 3, at least one control amount z and at least one observation output y are output from at least one external input w and at least one control input u, and a controller K that is designed by a robust control system design method called H∞ control or a μ design method so as to decrease a response from the external input w to the control amount z is mounted in an electronic calculator. A specific procedure for numerically deriving the controller K from the generalized plant P by utilization of the H∞ control or the μ design method so as to achieve a desired control purpose is described in detail in, for example, "Linear Robust Control" written by Liu Yasushi, published in 2002 by Corona Publishing Co., Ltd. and "Control System Design with MATLAB" written together by Nonami Kenzo, Nishimura Hidekazu and Hirata Mitsuo, published in 1998 by Tokyo Denki University Press, and thus detailed description thereof will be omitted here.

Figure 16:
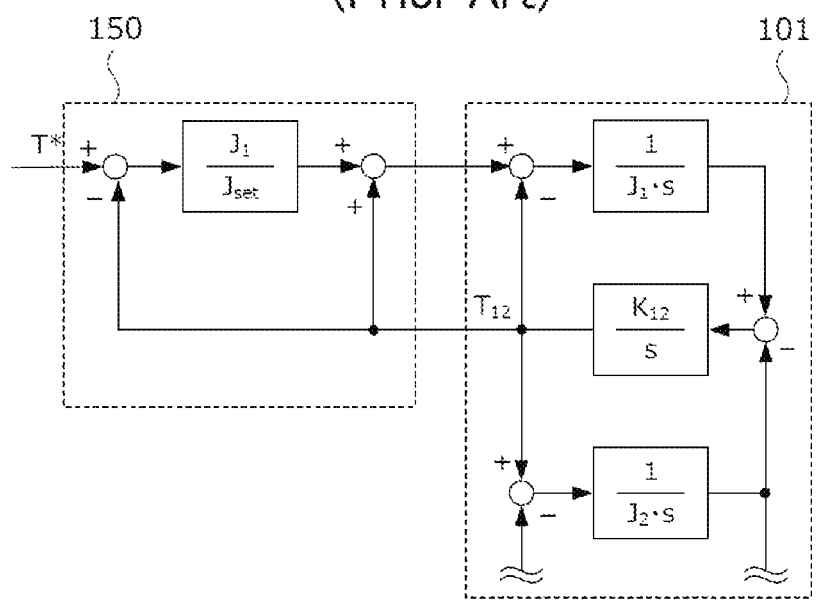
FIG. 16 is a diagram showing an example of the conventional electric inertia control device.

The effects of the electric inertia control device 5A in the present example will then be described in comparison with the result of a simulation in which the electric inertia control device 150 described with reference to FIG. 16 is used as a comparative example.

Figure 4:
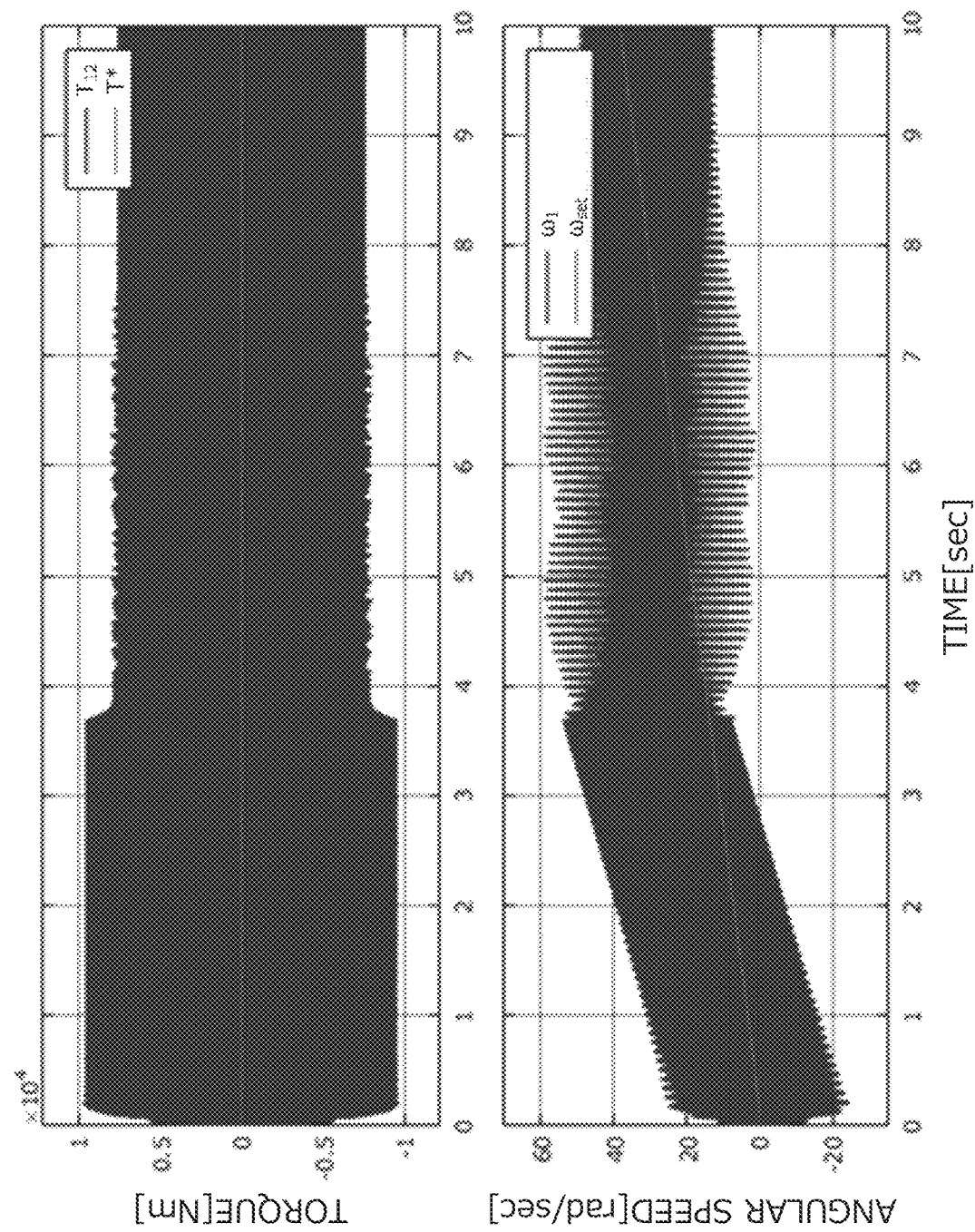
FIG. 4 is a diagram showing the result of a simulation of an electric inertia control device in a comparative example.

FIG. 4 is a diagram showing the result of the simulation of the electric inertia control device 150 in the comparative example. In this simulation, an actual environment is assumed, and thus a predetermined wasted time is set to an input-side shaft torque detection signal $T_{12}$. The upper part of FIG. 4 shows time changes in the higher-level command torque signal T* and the input-side shaft torque detection signal $T_{12}$, and the lower part of FIG. 4 shows time changes in an input-side angular speed detection signal $\omega_1$ and an inertia equivalent speed $\omega_{set}$. Here, the inertia equivalent speed $\omega_{set}$ refers to the angular speed $(\omega_{set}=(1/J_{set}\cdot s)\times(T^*-T_{12}))$ of the shaft of the input-side dynamometer obtained when the higher-level command torque signal T* is directly input to a virtual control target in which the moment of inertia of the input-side dynamometer is set not to $J_1$ but to the set moment of inertia $J_{set}$. In other words, whether or not the inertia equivalent speed $\omega_{set}$ agrees with the input-side angular speed detection signal $\omega_1$ serves as a criterion for determining the degree of achievement of electric inertia control. In this simulation, the higher-level command torque signal T* is increased from 0 [Nm] to 10 [Nm] when about one second has elapsed after time 0, and is thereafter constant so as to be 10 [Nm] (see FIG. 5 which will be described later).

As shown in the upper part of FIG. 4, in the electric inertia control device 150 of the comparative example, slight variations in the higher-level command torque signal T* are caused, and thus a behavior is shown in which the input-side shaft torque detection signal $T_{12}$ oscillates between about −10000 [Nm] and +10000 [Nm] due to resonance present in the dynamometer system. As shown in the lower part of FIG. 4, in the electric inertia control device 150 of the comparative example, the input-side angular speed detection signal $\omega_1$ also significantly oscillates due to the divergent behavior of the input-side shaft torque detection signal $T_{12}$. Hence, the input-side angular speed detection signal $\omega_1$ and the inertia equivalent speed $\omega_{set}$ are significantly separated, and thus the electric inertia control device 150 cannot achieve the purpose of the electric inertia control.

Figure 5:
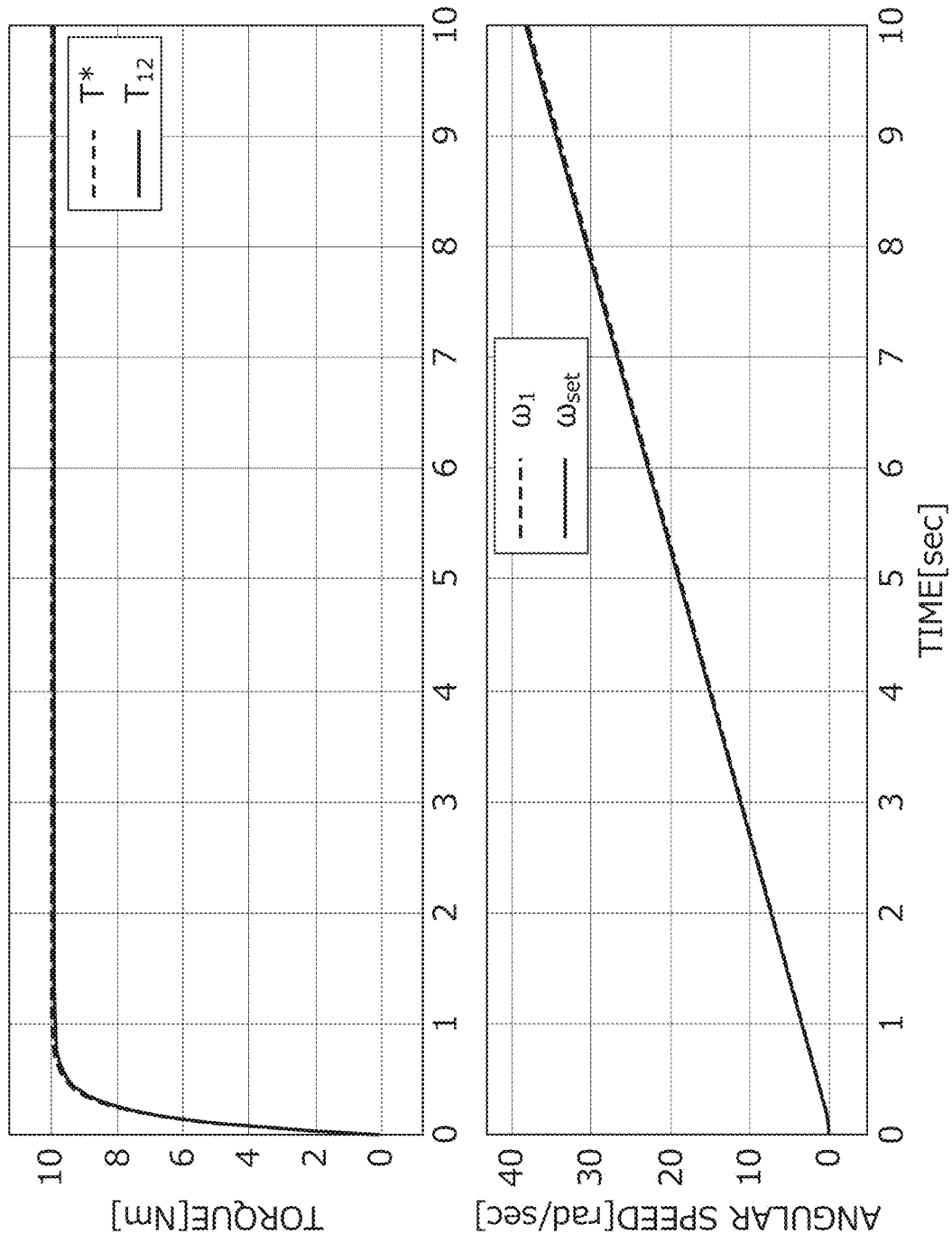
FIG. 5 is a diagram showing the result of a simulation of the electric inertia control device in example 1.

FIG. 5 is a diagram showing the result of a simulation of the electric inertia control device 5A in example 1. In the electric inertia control device 5A of example 1, with the inertia compensator 51A, the input-side shaft torque detection signal $T_{12}$ is directly fed back so as to generate the inertia compensation torque signal $T_{ref}$, and thus it is possible to make the input-side shaft torque detection signal $T_{12}$ rapidly follow variations in the higher-level command torque signal T* and to make the input-side angular speed detection signal $\omega_1$ agree with the inertia equivalent speed $\omega_{set}$ highly accurately. In the electric inertia control device 5A of example 1, the inertia compensation torque signal $T_{ref}$ generated in the inertia compensator 51A and the input-side shaft torque detection signal $T_{12}$ are used to generate the input-side torque current command signal $T_1$ with the resonance suppression control circuit 53A, and thus it is possible to suppress the oscillation of the input-side shaft torque detection signal $T_{12}$ which cannot be suppressed in the electric inertia control device 150 of comparative example, with the result that it is possible to make the input-side shaft torque detection signal $T_{12}$ substantially agree with the higher-level command torque signal T*. In this way, it is possible to make the input-side angular speed detection signal $\omega_1$ agree with the inertia equivalent speed $\omega_{set}$.

Example 2

The electric inertia control device 5B of example 2 will then be described with reference to FIG. 6. In the following description, the same configurations as those of the electric inertia control device 5A in example 1 are identified with the same reference numerals, and the detailed description thereof will be omitted.

Figure 6:
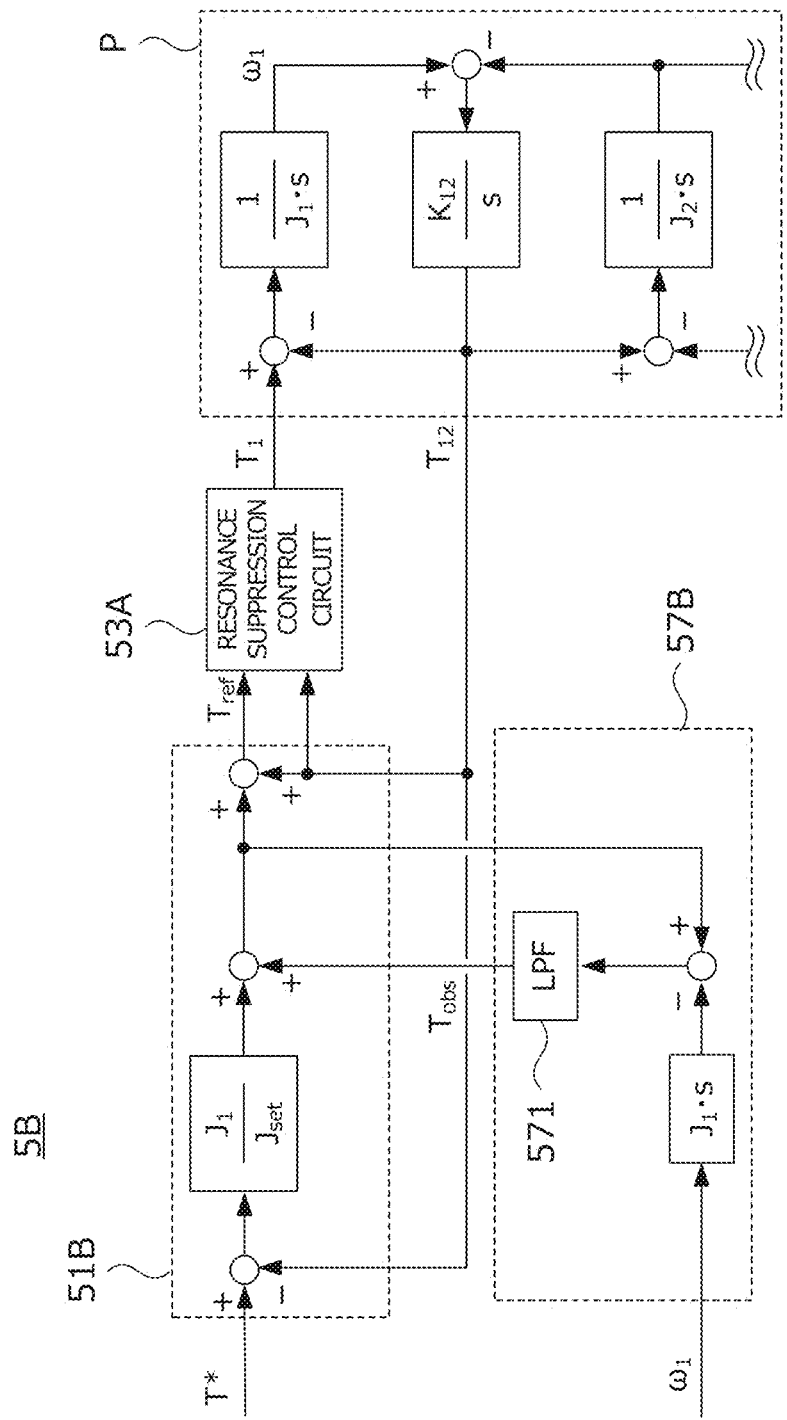
FIG. 6 is a diagram showing the configuration of a control circuit in the electric inertia control device of example 2.

FIG. 6 is a diagram showing the configuration of a control circuit in the electric inertia control device 5B of example 2. The electric inertia control device 5B includes: an inertia compensator 51B which generates, based on the higher-level command torque signal T* and the input-side shaft torque detection signal $T_{12}$, the inertia compensation torque signal $T_{ref}$ that simulates the inertial body having the predetermined set moment of inertia $J_{set}$; the resonance suppression control circuit 53A; and a disturbance observer 57B which uses a difference between an estimation signal obtained by using the inertia compensator 51B and a detection signal obtained by using the input-side angular speed detection signal $\omega_1$ so as to generate a disturbance compensation torque signal $T_{obs}$.

The inertia compensator 51B generates the inertia compensation torque signal $T_{ref}$ based on formula (2) below.

More specifically, the inertia compensator 51B generates a pre-conversion torque signal by subtracting the input-side shaft torque detection signal $T_{12}$ from the higher-level command torque signal $T^*$, and multiplies the pre-conversion torque signal by a ratio $(J_1/J_{set})$ of the moment of inertia $J_1$ of the input-side dynamometer to the set moment of inertia $J_{set}$ so as to generate a post-conversion torque signal $((J_1/J_{set})\times(T^*-T_{12}))$. The inertia compensator 51B sums the post-conversion torque signal and the disturbance compensation torque signal $T_{obs}$ generated in the disturbance observer 57B and the input-side shaft torque detection signal $T_{12}$ so as to generate the inertia compensation torque signal $T_{ref}$.

$$T_{ref}=(J_1/J_{set})\times(T^*-T_{12})+T_{obs}+T_{12} \qquad (2)$$

The disturbance observer 57B subtracts, from a torque estimation signal $((J_1/J_{set})\times(T^*-T_{12})+T_{obs})$ obtained by summing the pre-conversion torque signal and the disturbance compensation torque signal in the inertia compensator 51B and having the dimension of the torque, a torque detection signal $(J_1\cdot s\cdot\omega_1)$ obtained by differentiating the input-side angular speed detection signal $\omega_1$ and further multiplying the resulting signal by the moment of inertia $J_1$ of the input-side dynamometer 11, further assumes that a signal obtained by removing, from this signal, noises of frequency components higher than a predetermined cutoff frequency with a low-pass filter 571 is the disturbance compensation torque signal $T_{obs}$ and outputs the disturbance compensation torque signal $T_{obs}$ to the inertia compensator 51B.

Incidentally, in an actual dynamometer system S, unlike a control target P shown in FIG. 6, the torque current command signal $T_1$ generated in the electric inertia control device is input through the input-side inverter 21 to the input-side dynamometer 11, and a certain degree of loss is present in the input-side dynamometer 11. Hence, in the input-side dynamometer 11, a torque equal to the torque current command signal $T_1$ is prevented from occurring, and a certain degree of error occurs. In the present example, in the disturbance observer 57B, a difference between an estimation signal obtained in the inertia compensator 51B and a detection signal obtained by using the input-side angular speed sensor 31 is used to generate the disturbance compensation torque signal $T_{obs}$ for compensating for such a disturbance, and this signal is fed back to the inertia compensator 51B, with the result that electric inertia control free from error is realized.

The effects of the electric inertia control device 5B in the present example will then be described in comparison with the electric inertia control device 5A in example 1. Here, as in the simulation shown in FIGS. 4 and 5, the actual environment is assumed, and thus the predetermined wasted time is set to the input-side shaft torque detection signal $T_{12}$. Here, it is assumed that an unintended disturbance is input, and thus a signal obtained by superimposing a predetermined disturbance torque signal on the torque current command signal $T_1$ generated in the electric inertia control devices 5A, 5B is input to the input-side dynamometer.

Figure 7:
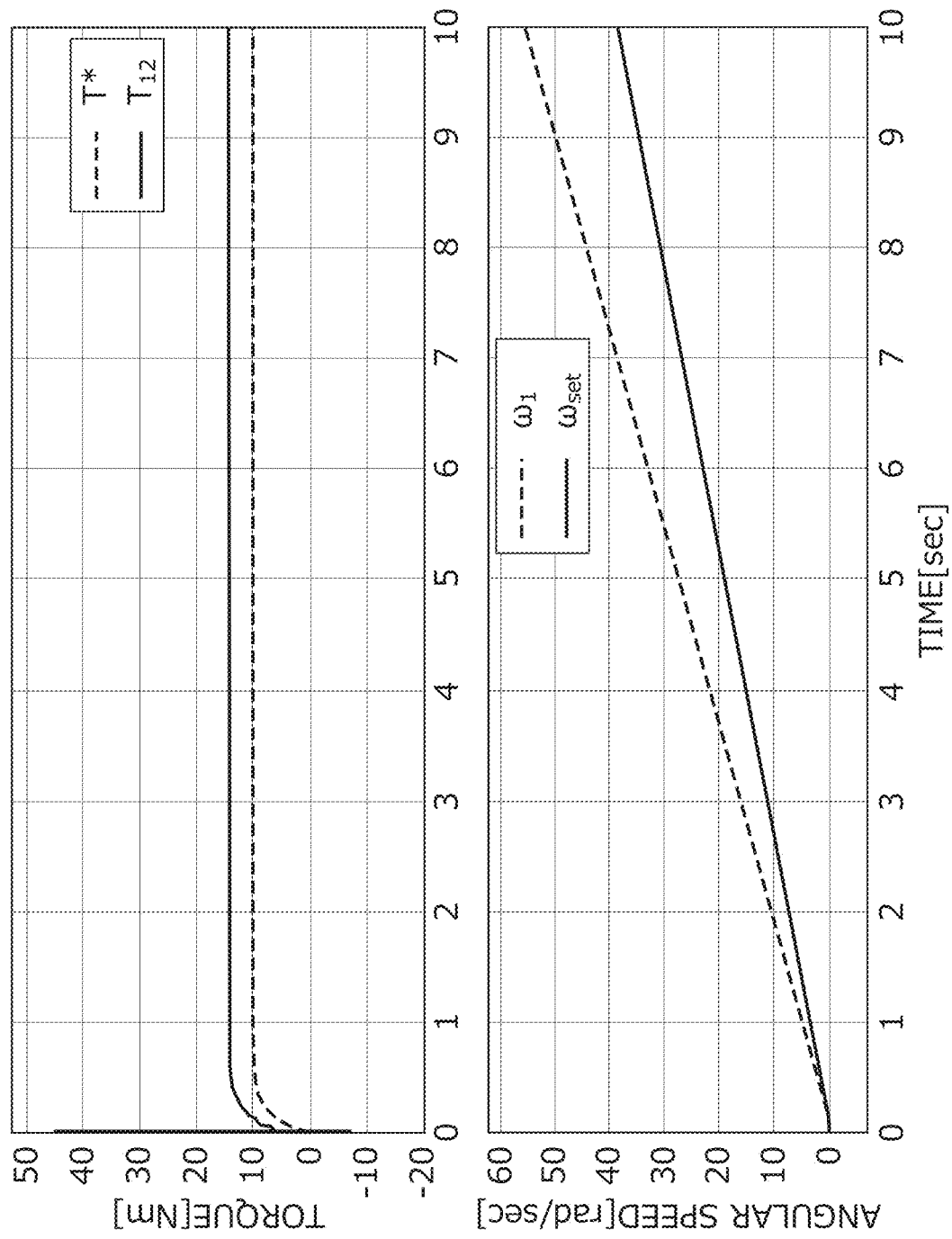
FIG. 7 is a diagram showing the result of the simulation of the electric inertia control device in example 1.

FIG. 7 is a diagram showing the result of the simulation of the electric inertia control device 5A in example 1. In the electric inertia control device 5A of example 1, since the presence of a disturbance is not considered, as shown in FIG. 7, a certain amount of error is left between the higher-level command torque signal $T^*$ and the input-side shaft torque detection signal $T_{12}$. Hence, the input-side angular speed detection signal $\omega_1$ and the inertia equivalent speed $\omega_{set}$ are significantly separated. Therefore, when a disturbance is present, it is likely that the electric inertia control device 5A cannot achieve the purpose of the electric inertia control.

Figure 8:
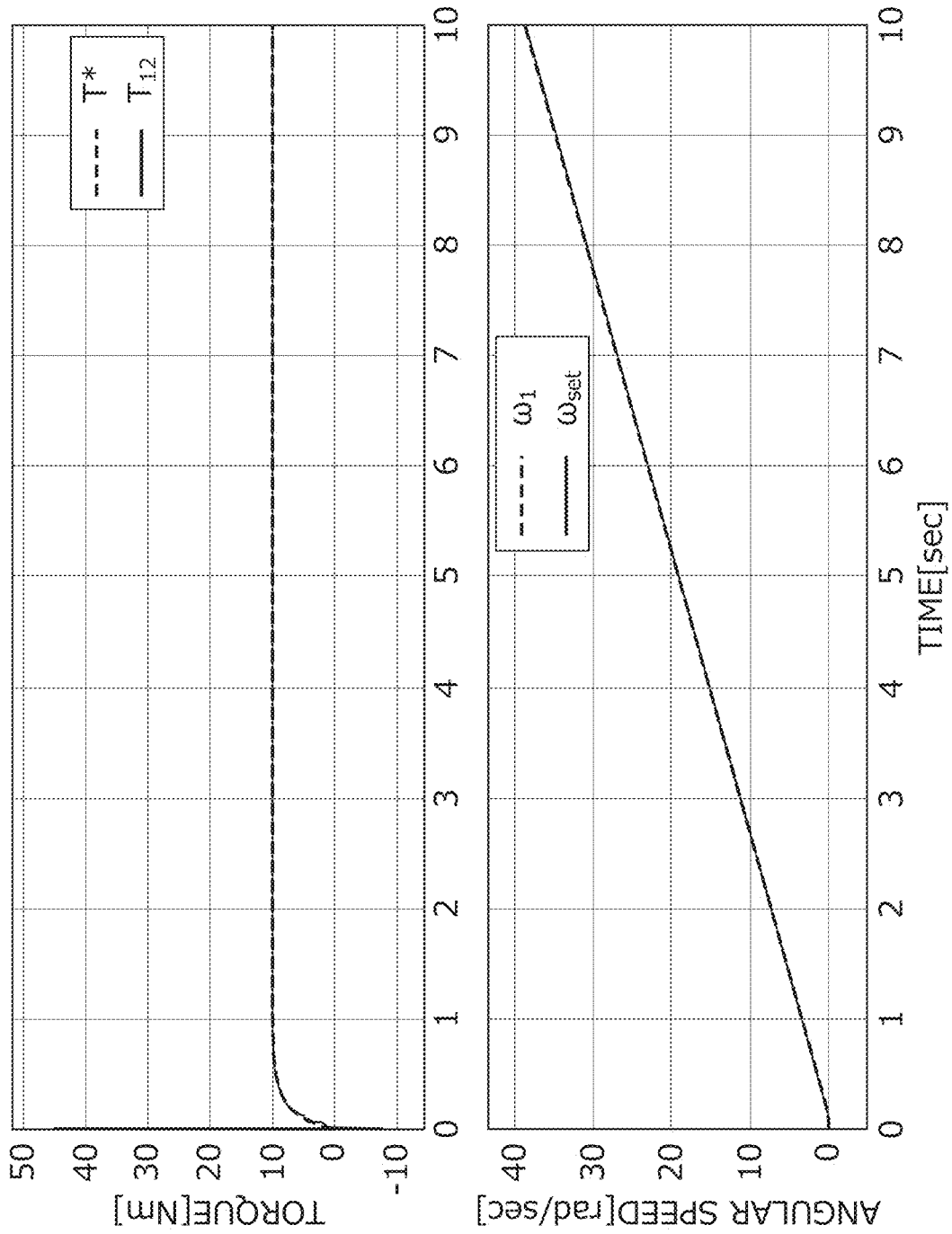
FIG. 8 is a diagram showing the result of the simulation of the electric inertia control device in example 2.

FIG. 8 is a diagram showing the result of a simulation of the electric inertia control device 5B in example 2. In the electric inertia control device 5B of example 2, with the inertia compensator 51B, the input-side shaft torque detection signal $T_{12}$ is directly fed back, the disturbance compensation torque signal $T_{obs}$ generated in the disturbance observer 57B is used and thus the inertia compensation torque signal $T_{ref}$ is generated. Hence, while an error caused by a disturbance is being removed, it is possible to make the input-side shaft torque detection signal $T_{12}$ rapidly follow variations in the higher-level command torque signal $T^*$ and to make the input-side angular speed detection signal $\omega_1$ agree with the inertia equivalent speed $\omega_{set}$ highly accurately.

Example 3

The electric inertia control device 5C of example 3 will then be described with reference to FIG. 9. In the following description, the same configurations as those of the electric inertia control device 5A in example 1 are identified with the same reference numerals, and the detailed description thereof will be omitted.

Figure 9:
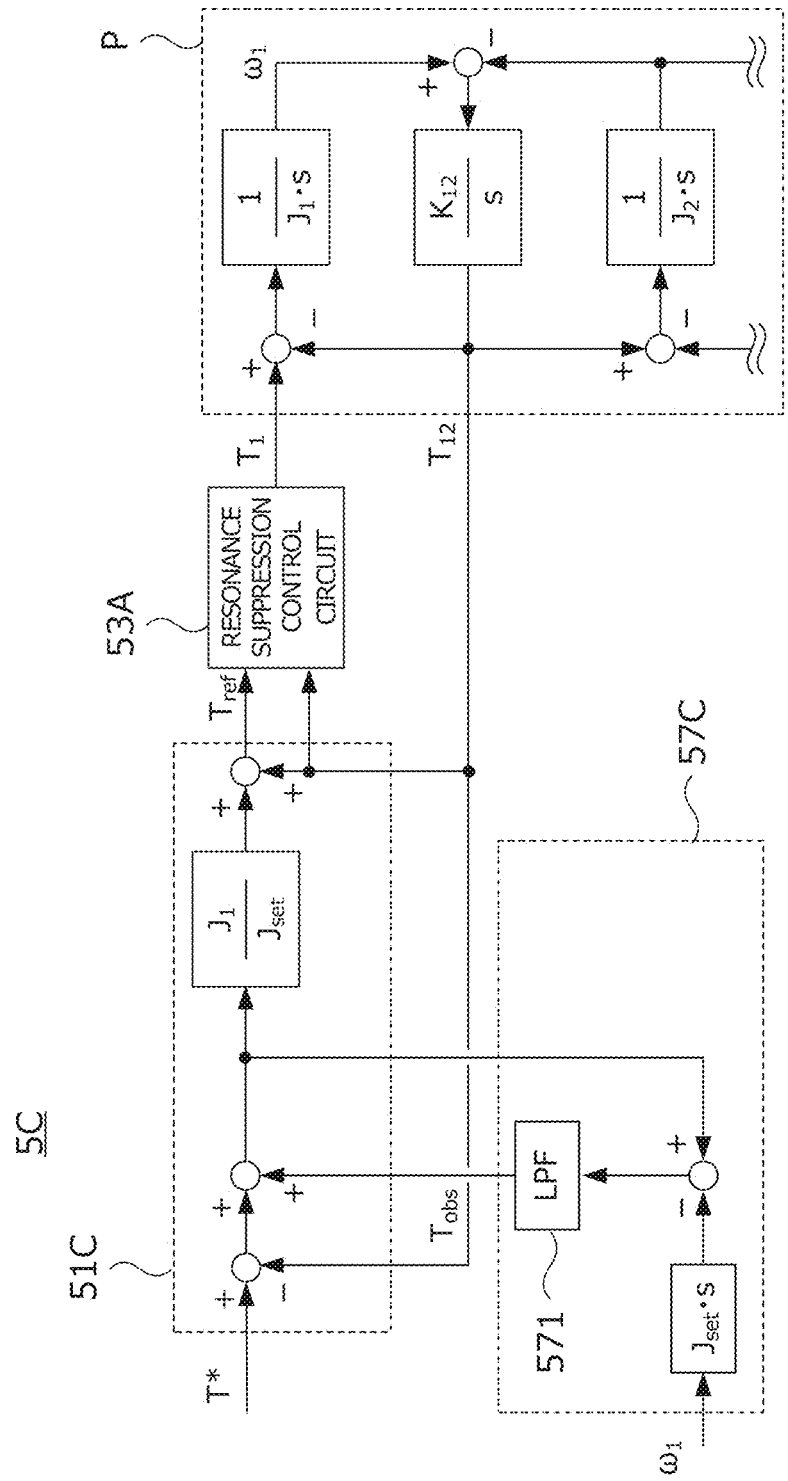
FIG. 9 is a diagram showing the configuration of a control circuit in the electric inertia control device of example 3.

FIG. 9 is a diagram showing the configuration of a control circuit in the electric inertia control device 5C of example 3. The electric inertia control device 5C includes: an inertia compensator 51C which generates, based on the higher-level command torque signal $T^*$ and the input-side shaft torque detection signal $T_{12}$, the inertia compensation torque signal $T_{ref}$ that simulates the inertial body having the predetermined set moment of inertia $J_{set}$; the resonance suppression control circuit 53A; and a disturbance observer 57C which uses a difference between an estimation signal obtained by using the inertia compensator 51C and a detection signal obtained by using the input-side angular speed detection signal $\omega_1$ so as to generate the disturbance compensation torque signal $T_{obs}$.

The inertia compensator 51C generates the inertia compensation torque signal $T_{ref}$ based on formula (3) below. More specifically, the inertia compensator 51C sums a torque signal obtained by subtracting the input-side shaft torque detection signal $T_{12}$ from the higher-level command torque signal $T^*$ and the disturbance compensation torque signal $T_{obs}$ generated in the disturbance observer 57C so as to generate a pre-conversion torque signal $(T^*-T_{12}+T_{obs})$. The inertia compensator 51C multiplies the pre-conversion torque signal by a ratio $(J_1/J_{set})$ of the moment of inertia $J_1$ of the input-side dynamometer to the set moment of inertia $J_{set}$ so as to generate the post-conversion torque signal. The inertia compensator 51C sums the post-conversion torque signal and the input-side shaft torque detection signal $T_{12}$ so as to generate the inertia compensation torque signal $T_{ref}$.

$$T_{ref}=(J_1/J_{set})\times(T^*-T_{12}+T_{obs})+T_{12} \qquad (3)$$

The disturbance observer 57C subtracts, from the pre-conversion torque signal $(T^*-T_{12}+T_{obs})$ in the inertia compensator 51C, a torque detection signal $(J_1\cdot s\cdot\omega_1)$ obtained by differentiating the input-side angular speed detection signal $\omega_1$ and further multiplying the resulting signal by the set moment of inertia $J_{set}$, further assumes that a signal obtained by removing, from this signal, noises of frequency components higher than a predetermined cutoff frequency with the low-pass filter 571 is the disturbance compensation torque signal $T_{obs}$ and outputs the disturbance compensation torque signal $T_{obs}$ to the inertia compensator 51B.

The effects of the electric inertia control device 5C in the present example will then be described. Here, as in the simulation shown in FIGS. 4 and 5, the actual environment is assumed, and thus the predetermined wasted time is set to the input-side shaft torque detection signal $T_{12}$. In order for a torque pulsation in an actual engine to be reproduced, in the higher-level command torque signal T*, it is assumed that the maximum value is 100 [Nm] and that the minimum value is −100 [Nm], and the higher-level command torque signal T* is made to oscillate at a predetermined excitation frequency lower than the resonance frequency of the dynamometer system.

Figure 10:
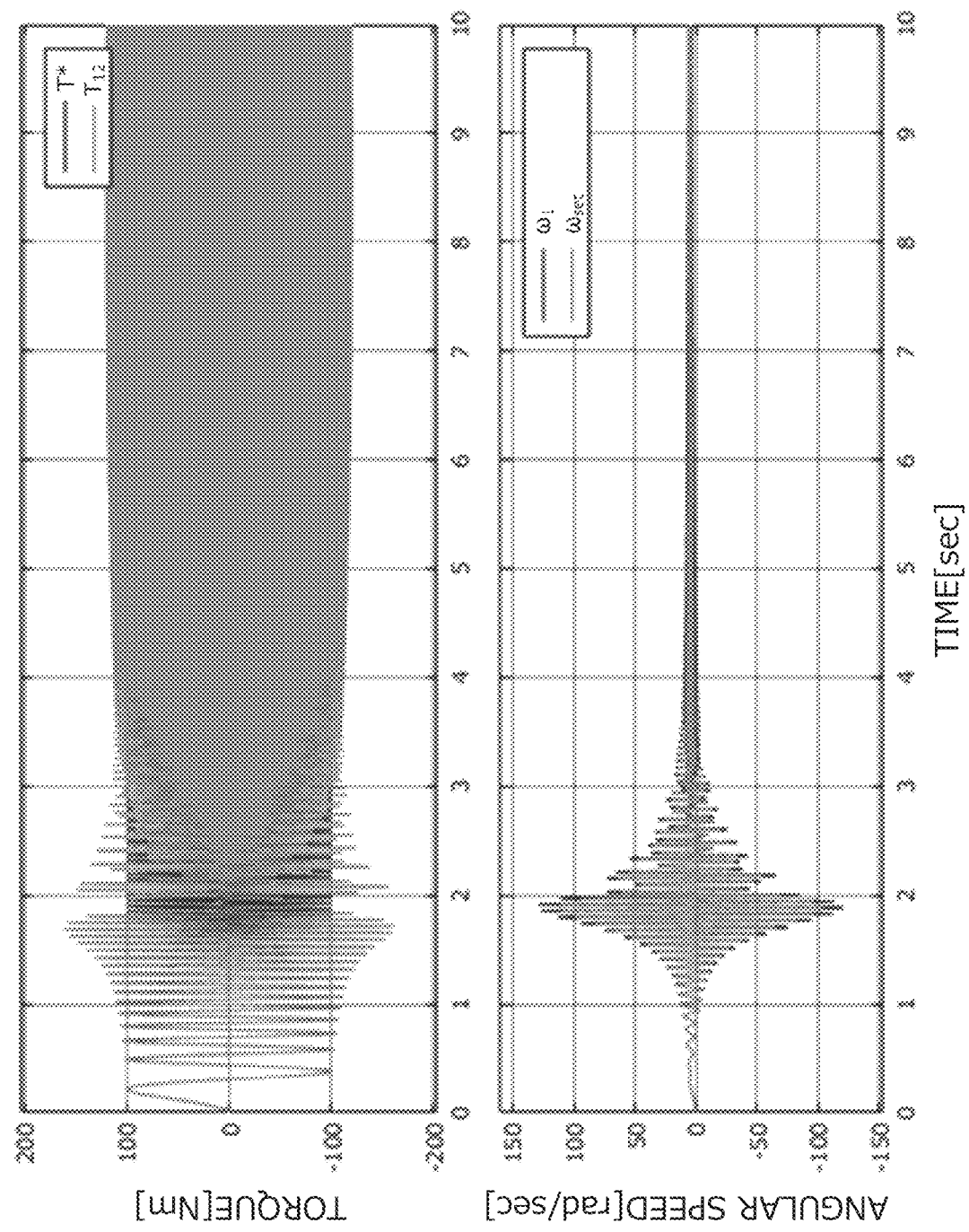
FIG. 10 is a diagram showing the result of a simulation of the electric inertia control device in example 3.

FIG. 10 is a diagram showing the result of a simulation of the electric inertia control device 5C in example 3. As shown in FIG. 10, in the electric inertia control device 5C of example 3, with the inertia compensator 51C, the input-side shaft torque detection signal $T_{12}$ is directly fed back so as to generate the inertia compensation torque signal $T_{ref}$, and furthermore, the inertia compensation torque signal $T_{ref}$ and the input-side shaft torque detection signal $T_{12}$ are used to generate the input-side torque current command signal $T_1$ with the resonance suppression control circuit 53A. In this way, while a resonance phenomenon in the dynamometer system is being suppressed, it is possible to make the input-side shaft torque detection signal $T_{12}$ follow the higher-level command torque signal T* which oscillates at the excitation frequency. In this way, as shown in FIG. 10, it is also possible to make the input-side angular speed detection signal $\omega_1$ highly accurately agree with the inertia equivalent speed $\omega_{set}$ which oscillates at the excitation frequency.

The effects of the electric inertia control device 5C in the present example will then be described in comparison with the electric inertia control device 5C in example 2. Here, as in the simulation shown in FIGS. 4 and 5, the actual environment is assumed, and thus the predetermined wasted time is set to the input-side shaft torque detection signal $T_{12}$, and moreover, as in the simulation shown in FIG. 10, the higher-level command torque signal T* is made to oscillate at the predetermined excitation frequency. Here, in the moment of inertia $J_1$ set in the electric inertia control device 5B, 5C, a predetermined deviation is provided with respect to the actual moment of inertia of the input-side dynamometer.

Figure 11:
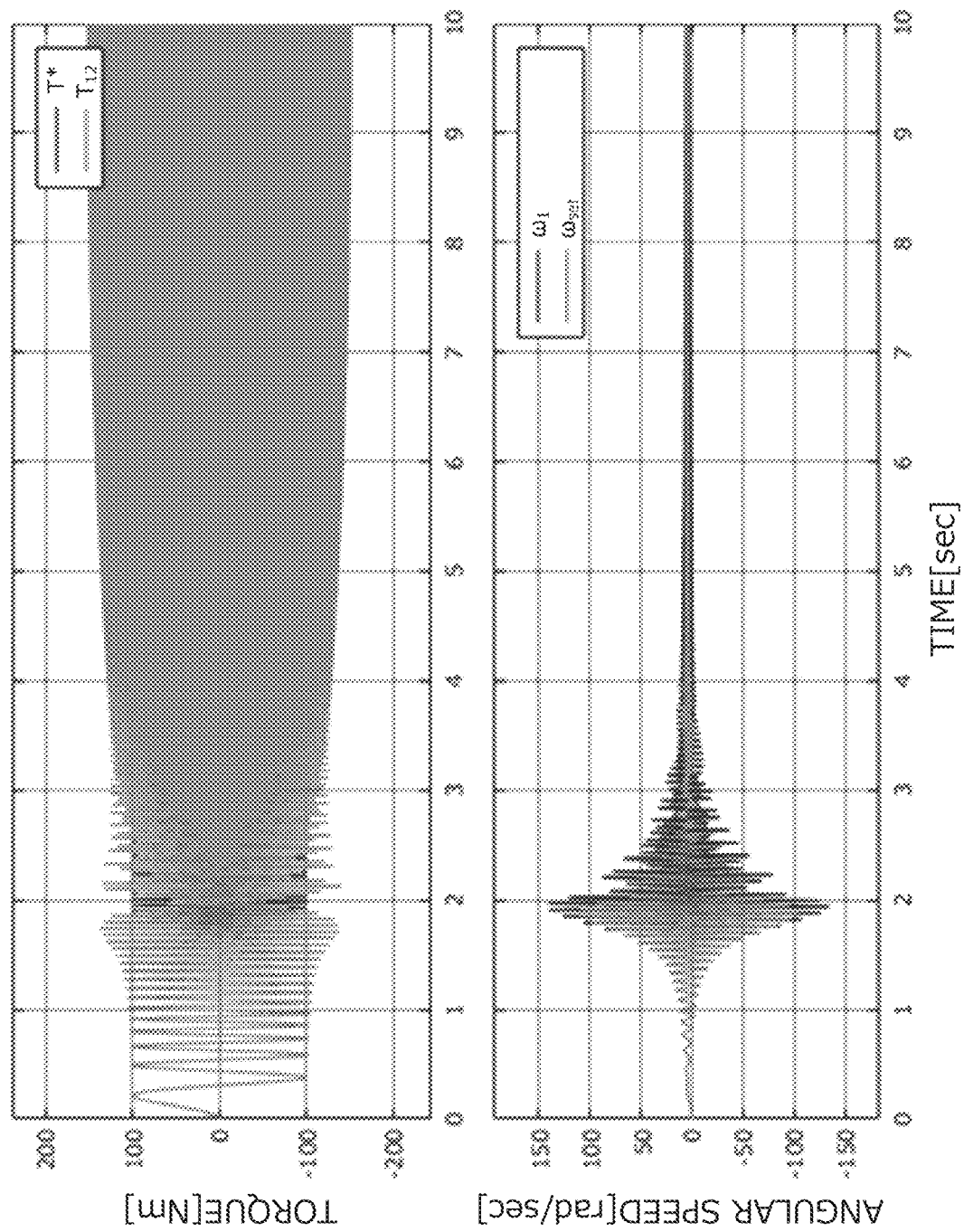
FIG. 11 is a diagram showing the result of the simulation of the electric inertia control device in example 2.

FIG. 11 is a diagram showing the result of the simulation of the electric inertia control device 5B in example 2. As shown in FIG. 11, in the electric inertia control device 5B of example 2, a slight deviation occurs between the input-side angular speed detection signal $\omega_1$ and the inertia equivalent speed $\omega_{set}$. As shown in FIG. 6, the disturbance observer 57B in the electric inertia control device 5B of example 2 performs disturbance compensation on the post-conversion torque signal after the multiplication by the ratio $(J_1/J_{set})$ of the moment of inertia. Hence, when a design error or a deviation caused by another member or the like occurs in the moment of inertia $J_1$ in the electric inertia control device 5B, a compensation deviation as shown in FIG. 11 may occur.

Figure 12:
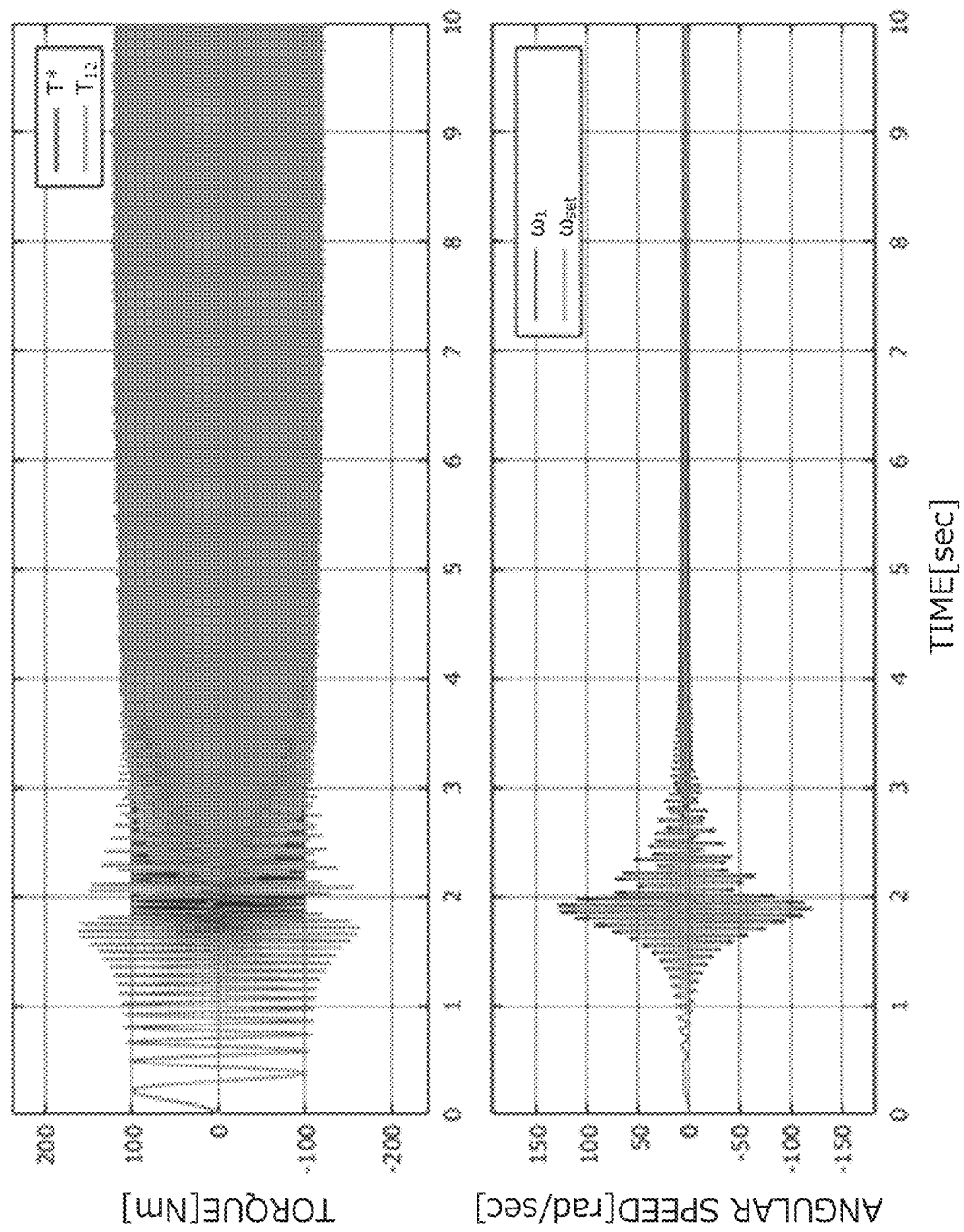
FIG. 12 is a diagram showing the result of the simulation of the electric inertia control device in example 3.

FIG. 12 is a diagram showing the result of the simulation of the electric inertia control device 5C in example 3. Unlike the electric inertia control device 5B of example 2, the disturbance observer 57C in the electric inertia control device 5C of example 3 performs disturbance compensation on the pre-conversion torque signal before the multiplication by the ratio $(J_1/J_{set})$ of the moment of inertia. Hence, in the electric inertia control device 5C, it is also possible to compensate for an estimation error in the moment of inertia $J_1$, and thus as shown in FIG. 12, it is possible to make the input-side angular speed detection signal $\omega_1$ follow the inertia equivalent speed $\omega_{set}$ highly accurately.

Example 4

The electric inertia control device 5D of example 4 will then be described with reference to FIG. 13. In the following description, the same configurations as those of the electric inertia control device 5A in example 1 are identified with the same reference numerals, and the detailed description thereof will be omitted.

Figure 13:
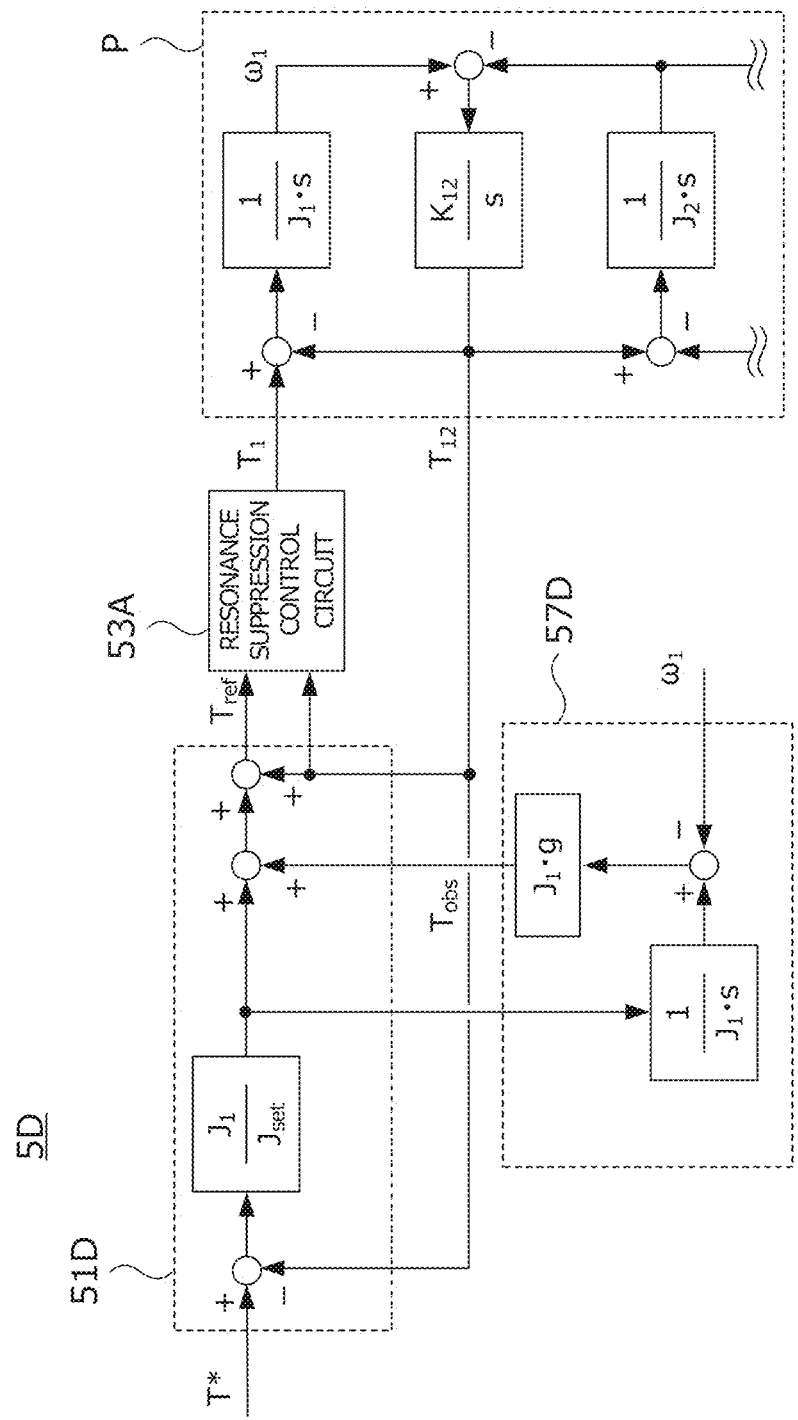
FIG. 13 is a diagram showing the configuration of a control circuit in the electric inertia control device of example 4.

FIG. 13 is a diagram showing the configuration of a control circuit in the electric inertia control device 5D of example 4. The electric inertia control device 5D includes: an inertia compensator 51D which generates, based on the higher-level command torque signal T* and the input-side shaft torque detection signal $T_{12}$, the inertia compensation torque signal $T_{ref}$ that simulates the inertial body having the predetermined set moment of inertia $J_{set}$; the resonance suppression control circuit 53A; and a disturbance observer 57D which uses a difference between an estimation signal obtained by using the inertia compensator 51D and a detection signal obtained by using the input-side angular speed detection signal $\omega_1$ so as to generate the disturbance compensation torque signal $T_{obs}$.

The inertia compensator 51D generates the inertia compensation torque signal $T_{ref}$ based on formula (4) below. More specifically, the inertia compensator 51D generates the pre-conversion torque signal by subtracting the input-side shaft torque detection signal $T_{12}$ from the higher-level command torque signal T*, and multiplies the pre-conversion torque signal by a ratio $(J_1/J_{set})$ of the moment of inertia $J_1$ of the input-side dynamometer to the set moment of inertia $J_{set}$ so as to generate the post-conversion torque signal $((J_1/J_{set})\times(T^*-T_{12}))$. The inertia compensator 51D sums the post-conversion torque signal and the disturbance compensation torque signal $T_{obs}$ generated in the disturbance observer 57D and the input-side shaft torque detection signal $T_{12}$ so as to generate the inertia compensation torque signal $T_{ref}$.

$$T_{ref}=(J_1/J_{set})\times(T^*-T_{12})+T_{obs}+T_{12} \quad (4)$$

The disturbance observer 57D subtracts, from an angular speed estimation signal obtained by integrating the post-conversion torque signal $((J_1/J_{set})\times(T^*-T_{12}))$ in the inertia compensator 51D and further multiplying the resulting signal by the reciprocal of the moment of inertia $J_1$ of the input-side dynamometer 11 and having the dimension of the angular speed, the input-side angular speed detection signal $\omega_1$, further assumes that a signal obtained by multiplying this signal by the moment of inertia $J_1$ of the input-side dynamometer 11 and a dimensionless gain g is the disturbance compensation torque signal $T_{obs}$ and outputs the disturbance compensation torque signal $T_{obs}$ to the inertia compensator 51D.

Example 5

The electric inertia control device 5E of example 5 will then be described with reference to FIG. 14. In the following description, the same configurations as those of the electric inertia control device 5A in example 1 are identified with the same reference numerals, and the detailed description thereof will be omitted.

Figure 14:
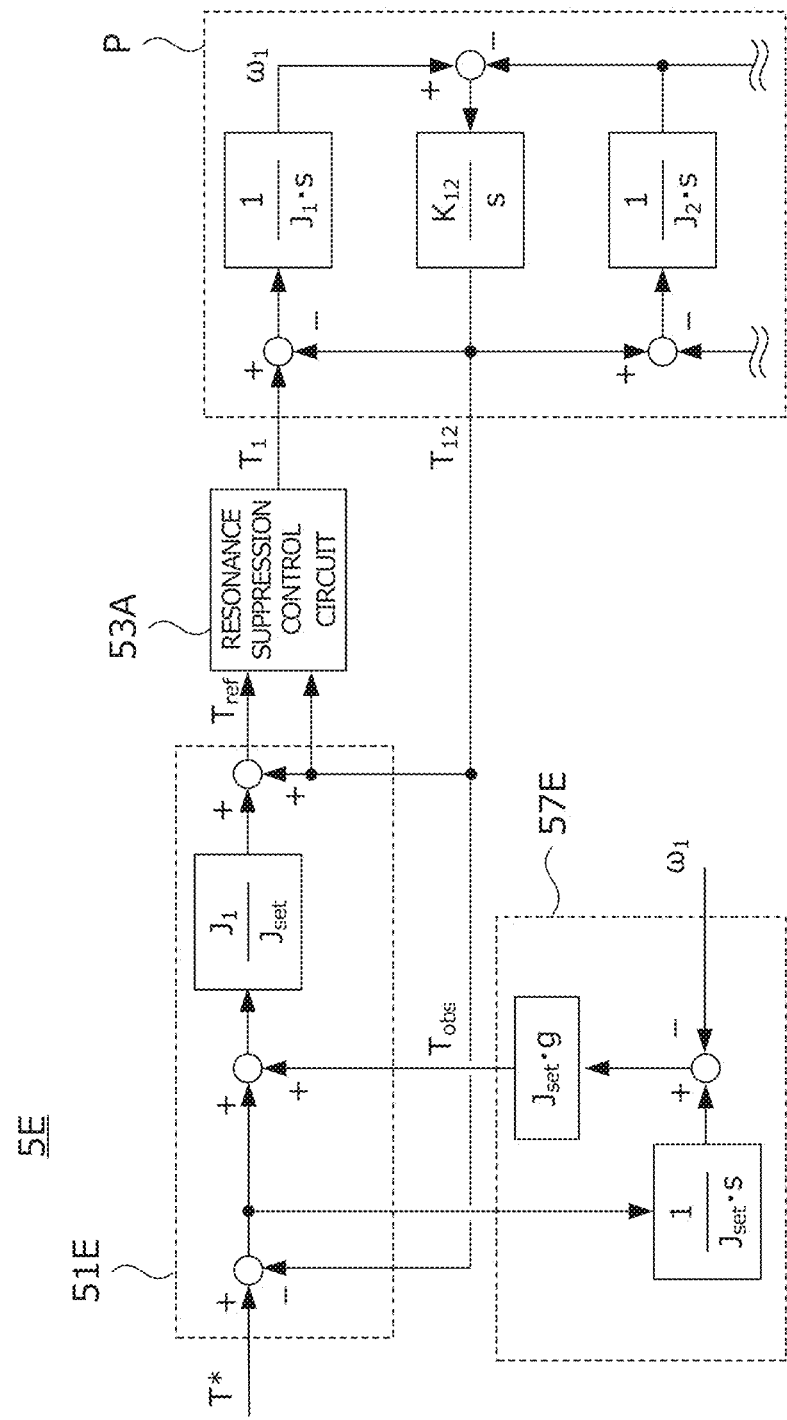
FIG. 14 is a diagram showing the configuration of a control circuit in the electric inertia control device of example 5.
Figure 15:
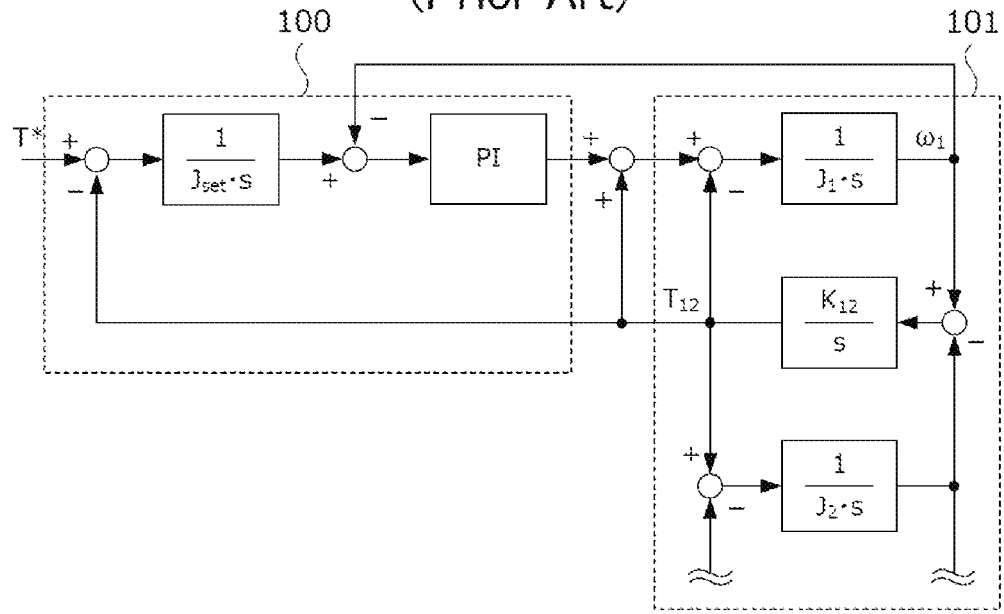
FIG. 15 is a diagram showing an example of a conventional electric inertia control device.

FIG. 14 is a diagram showing the configuration of a control circuit in the electric inertia control device 5E of example 5. The electric inertia control device 5E includes:

an inertia compensator 51E which generates, based on the higher-level command torque signal T* and the input-side shaft torque detection signal $T_{12}$, the inertia compensation torque signal $T_{ref}$ that simulates the inertial body having the predetermined set moment of inertia $J_{set}$; the resonance suppression control circuit 53A; and a disturbance observer 57E which uses a difference between an estimation signal obtained by using the inertia compensator 51E and a detection signal obtained by using the input-side angular speed detection signal $\omega_1$ so as to generate the disturbance compensation torque signal $T_{obs}$.

The inertia compensator 51E generates the inertia compensation torque signal $T_{ref}$ based on formula (5) below. More specifically, the inertia compensator 51E sums a torque signal obtained by subtracting the input-side shaft torque detection signal $T_{12}$ from the higher-level command torque signal T* and the disturbance compensation torque signal $T_{obs}$ generated in the disturbance observer 57E so as to generate the pre-conversion torque signal $(T^*-T_{12}+T_{obs})$. The inertia compensator 51E multiplies the pre-conversion torque signal by the ratio $(J_1/J_{set})$ of the moment of inertia $J_1$ of the input-side dynamometer to the set moment of inertia $J_{set}$ so as to generate the post-conversion torque signal. The inertia compensator 51E sums the post-conversion torque signal and the input-side shaft torque detection signal $T_{12}$ so as to generate the inertia compensation torque signal $T_{ref}$.

$$T_{ref}=(J_1/J_{set})\times(T^*-T_{12}+T_{obs})+T_{12} \quad (5)$$

The disturbance observer 57E subtracts, from an angular speed estimation signal obtained by integrating a torque signal $(T^*-T_{12})$ obtained by subtracting the input-side shaft torque detection signal $T_{12}$ from the higher-level command torque signal T* in the inertia compensator 51E and further multiplying the resulting signal by the reciprocal of the set moment of inertia $J_{set}$ and having the dimension of the angular speed, the input-side angular speed detection signal $\omega_1$, further assumes that a signal obtained by multiplying this signal by the set moment of inertia $J_{set}$ and the dimensionless gain g is the disturbance compensation torque signal $T_{obs}$ and outputs the disturbance compensation torque signal $T_{obs}$ to the inertia compensator 51E.

Although the electric inertia control devices 5A to 5E of examples 1 to 5 in the present invention have been described, the present invention is not limited to these devices. More specifically, although in examples 1 to 5 discussed above, the cases are described where in the dynamometer system S formed by coupling the input-side dynamometer 11, the test piece W and the absorption-side dynamometer 12, the present invention is applied to the electric inertia control devices 5A to 5E which perform the electric inertia control on the input-side dynamometer 11, the present invention is not limited to these cases. The present invention may be applied to a case where in the dynamometer system S described above, the electric inertia control device of the present invention performs the electric inertia control on the absorption-side dynamometer 12.

EXPLANATION OF REFERENCE NUMERALS

S dynamometer system
W test piece
Wi input shaft
Wo output shaft
11 input-side dynamometer (dynamometer)
S1 input-side coupling shaft (coupling shaft)
21 input-side inverter (inverter)
31 input-side angular speed sensor (angular speed sensor)
41 input-side shaft torque sensor (shaft torque sensor)
5, 5A, 5B, 5C, 5D, 5E electric inertia control device

The invention claimed is:

1. A dynamometer system that includes: a test piece which has an input shaft and an output shaft, a dynamometer which is connected to any one of the input shaft or the output shaft through a coupling shaft, an inverter which supplies electric power to the dynamometer according to a torque current command signal, an angular speed sensor which generates an angular speed detection signal corresponding to an angular speed of the dynamometer, a shaft torque sensor which generates a shaft torque detection signal corresponding to a shaft torque occurring in the coupling shaft, and an electric inertia control device that simulates a behavior of an inertial body having predetermined set inertia by the dynamometer, the electric inertia control device comprising:

an inertia compensator which generates an inertia compensation torque signal that simulates the inertial body based on a higher-level command torque signal, the shaft torque detection signal, and a ratio of an inertia of the dynamometer to the set inertia;

a resonance suppression control circuit which generates the torque current command signal so as to suppress resonance inherent in the coupling shaft among resonances of a mechanical system that includes the test piece and the dynamometer by using the inertia compensation torque signal and the shaft torque detection signal; and a disturbance observer which generates a disturbance compensation torque signal that compensates for a deviation caused by a disturbance based on an estimation signal obtained by using the inertia compensator and the angular speed detection signal, wherein the inertia compensator generates a post-conversion torque signal by multiplying a difference between the shaft torque detection signal and the higher-level command torque signal by the ratio, and generates the inertia compensation torque signal by summing the post-conversion torque signal, the disturbance compensation torque signal and the shaft torque detection signal, and the disturbance observer generates the disturbance compensation torque signal by subtracting, from a sum of the post-conversion torque signal and the disturbance compensation torque signal, a product of the derivative of the angular speed detection signal and the inertia of the dynamometer.

2. A dynamometer system that includes: a test piece which has an input shaft and an output shaft, a dynamometer which is connected to any one of the input shaft or the output shaft through a coupling shaft, an inverter which supplies electric power to the dynamometer according to a torque current command signal, an angular speed sensor which generates an angular speed detection signal corresponding to an angular speed of the dynamometer, a shaft torque sensor which generates a shaft torque detection signal corresponding to a shaft torque occurring in the coupling shaft, and an electric inertia control device that simulates a behavior of an inertial body having predetermined set inertia by the dynamometer, the electric inertia control device comprising:

an inertia compensator which generates an inertia compensation torque signal that simulates the inertial body based on a higher-level command torque signal, the shaft torque detection signal, and a ratio of an inertia of the dynamometer to the set inertia;

a resonance suppression control circuit which generates the torque current command signal so as to suppress resonance inherent in the coupling shaft among resonances of a mechanical system that includes the test piece and the dynamometer by using the inertia compensation torque signal and the shaft torque detection signal; and a disturbance observer which generates a disturbance compensation torque signal that compensates for a deviation caused by a disturbance based on an estimation signal obtained by using the inertia compensator and the angular speed detection signal, wherein the inertia compensator generates a pre-conversion torque signal by summing the disturbance compensation torque signal and a difference between the shaft torque detection signal and the higher-level command torque signal, and generates the inertia compensation torque signal by summing the shaft torque detection signal and a product of the pre-conversion torque signal and the ratio, and the disturbance observer generates the disturbance compensation torque signal by subtracting, from the pre-conversion torque signal, a product of the derivative of the angular speed detection signal and the set inertia.

3. A dynamometer system that includes: a test piece which has an input shaft and an output shaft, a dynamometer which is connected to any one of the input shaft or the output shaft through a coupling shaft, an inverter which supplies electric power to the dynamometer according to a torque current command signal, an angular speed sensor which generates an angular speed detection signal corresponding to an angular speed of the dynamometer, a shaft torque sensor which generates a shaft torque detection signal corresponding to a shaft torque occurring in the coupling shaft, and an electric inertia control device that simulates a behavior of an inertial body having predetermined set inertia by the dynamometer, the electric inertia control device comprising:

an inertia compensator which generates an inertia compensation torque signal that simulates the inertial body based on a higher-level command torque signal, the shaft torque detection signal, and a ratio of an inertia of the dynamometer to the set inertia;

a resonance suppression control circuit which generates the torque current command signal so as to suppress resonance inherent in the coupling shaft among resonances of a mechanical system that includes the test piece and the dynamometer by using the inertia compensation torque signal and the shaft torque detection signal; and a disturbance observer which generates a disturbance compensation torque signal that compensates for a deviation caused by a disturbance based on an estimation signal obtained by using the inertia compensator and the angular speed detection signal, wherein the inertia compensator generates a post-conversion torque signal by multiplying a difference between the higher-level command torque and the shaft torque detection signal by the ratio, and generates the inertia compensation torque signal by summing the post-conversion torque signal, the disturbance compensation torque signal and the shaft torque detection signal, and the disturbance observer generates an angular speed signal by subtracting the angular speed detection signal from a product of the integral of the post-conversion torque signal and a reciprocal of the inertia of the dynamometer, and generates the disturbance compensation torque signal by multiplying the angular speed signal by a product of the inertia of the dynamometer and a predetermined gain.

4. A dynamometer system that includes: a test piece which has an input shaft and an output shaft, a dynamometer which is connected to any one of the input shaft or the output shaft through a coupling shaft, an inverter which supplies electric power to the dynamometer according to a torque current command signal, an angular speed sensor which generates an angular speed detection signal corresponding to an angular speed of the dynamometer, a shaft torque sensor which generates a shaft torque detection signal corresponding to a shaft torque occurring in the coupling shaft, and an electric inertia control device that simulates a behavior of an inertial body having predetermined set inertia by the dynamometer, the electric inertia control device comprising:

an inertia compensator which generates an inertia compensation torque signal that simulates the inertial body based on a higher-level command torque signal, the shaft torque detection signal, and a ratio of an inertia of the dynamometer to the set inertia;

a resonance suppression control circuit which generates the torque current command signal so as to suppress resonance inherent in the coupling shaft among resonances of a mechanical system that includes the test piece and the dynamometer by using the inertia compensation torque signal and the shaft torque detection signal; and a disturbance observer which generates a disturbance compensation torque signal that compensates for a deviation caused by a disturbance based on an estimation signal obtained by using the inertia compensator and the angular speed detection signal, wherein the inertia compensator generates a pre-conversion torque signal by summing the disturbance compensation torque signal and a difference between the shaft torque detection signal and the higher-level command torque signal, and generates the inertia compensation torque signal by summing the shaft torque detection signal and a product of the pre-conversion torque signal and the ratio, and the disturbance observer generates an angular speed signal by subtracting the angular speed detection signal from a product of a reciprocal of the set inertia and an integral of a difference between the shaft torque detection signal and the higher-level command torque signal, and generates the disturbance compensation torque signal by multiplying the angular speed signal by a product of the set inertia and a predetermined gain.

* * * * *